United States Patent
Rosu et al.

(10) Patent No.: US 11,907,863 B2
(45) Date of Patent: Feb. 20, 2024

(54) NATURAL LANGUAGE ENRICHMENT USING ACTION EXPLANATIONS

(71) Applicant: International Business Machines Corporation, Armonk, NY (US)

(72) Inventors: Daniela Rosu, Ossining, NY (US); Ruchi Mahindru, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 262 days.

(21) Appl. No.: 16/937,704

(22) Filed: Jul. 24, 2020

(65) Prior Publication Data

US 2022/0027768 A1 Jan. 27, 2022

(51) Int. Cl.
```
G06F 40/20      (2020.01)
G06F 40/205     (2020.01)
G06F 40/35      (2020.01)
G06F 40/40      (2020.01)
G06N 5/045      (2023.01)
G06F 40/56      (2020.01)
G06F 18/22      (2023.01)
```
(52) U.S. Cl.
CPC ............ *G06N 5/045* (2013.01); *G06F 18/22* (2023.01); *G06F 40/56* (2020.01)

(58) Field of Classification Search
CPC .. G06F 16/3329; G06F 16/3344; G06F 40/30; G06F 16/90332; G06F 40/205; G06F 3/04842; G06F 40/56; G06F 16/2455; G06F 16/338; G06F 6/24; G06F 16/242; G06F 16/33; G06F 16/3322; G06F 16/334; G06N 20/00; G06N 3/08; G06N 5/02
See application file for complete search history.

(56) References Cited

U.S. PATENT DOCUMENTS

| | | | |
|---|---|---|---|
| 8,538,744 B2 | 9/2013 | Roberts et al. | |
| 9,240,128 B2 * | 1/2016 | Bagchi | G09B 7/00 |
| 9,378,459 B2 * | 6/2016 | Skiba | G06N 5/022 |

(Continued)

FOREIGN PATENT DOCUMENTS

| | | |
|---|---|---|
| CN | 105550302 | 5/2016 |
| CN | 115803734 A | 3/2023 |

(Continued)

OTHER PUBLICATIONS

Li et al, "Efficient similarity search for tree-structured data", 2008, InScientific and Statistical Database Management: 20th International Conference, SSDBM 2008, Hong Kong, China, Jul. 9-11, 2008 Proceedings 20 2008 (pp. 131-149). Springer Berlin Heidelberg.*

(Continued)

*Primary Examiner* — Olujimi A Adesanya

(74) *Attorney, Agent, or Firm* — Jordan T. Schiller

(57) ABSTRACT

Embodiments are provided that relate to a computer system, a computer program product, and a computer-implemented method for improving performance of a dialog system employing an automated virtual dialog agent. Embodiments involve utilizing an automated virtual agent to receive a natural language request and generate a corresponding response, automatically identifying and resolving a corresponding knowledge gap between the request and response, and refining the automated virtual agent with the resolved knowledge gap.

25 Claims, 11 Drawing Sheets

(56) References Cited

U.S. PATENT DOCUMENTS

| | | | |
|---|---|---|---|
| 10,169,454 B2* | 1/2019 | Ait-Mokhtar | G06F 16/367 |
| 10,379,712 B2 | 8/2019 | Brown et al. | |
| 10,978,053 B1* | 4/2021 | Smythe | G10L 13/02 |
| 2011/0320187 A1 | 12/2011 | Motik et al. | |
| 2013/0017524 A1* | 1/2013 | Barborak | G06N 5/04 |
| | | | 434/322 |
| 2014/0072948 A1* | 3/2014 | Boguraev | G09B 7/00 |
| | | | 434/362 |
| 2014/0236577 A1* | 8/2014 | Malon | G06N 3/02 |
| | | | 704/9 |
| 2014/0310001 A1* | 10/2014 | Kalns | G10L 15/22 |
| | | | 704/270.1 |
| 2014/0324747 A1 | 10/2014 | Crowder et al. | |
| 2015/0121216 A1* | 4/2015 | Brown | G06N 3/008 |
| | | | 715/705 |
| 2016/0098394 A1* | 4/2016 | Bruno | G06F 40/30 |
| | | | 704/9 |
| 2018/0053119 A1* | 2/2018 | Zeng | G06F 40/205 |
| 2018/0054523 A1* | 2/2018 | Zhang | G06F 16/90332 |
| 2018/0075359 A1* | 3/2018 | Brennan | G06N 5/022 |
| 2018/0097749 A1 | 4/2018 | Ventura | |
| 2018/0293221 A1* | 10/2018 | Finkelstein | G06N 20/00 |
| 2018/0357272 A1 | 12/2018 | Bagchi et al. | |
| 2019/0026654 A1* | 1/2019 | Allen | G06N 20/00 |
| 2019/0042988 A1* | 2/2019 | Brown | G06F 9/547 |
| 2019/0043106 A1* | 2/2019 | Talmor | G06N 20/00 |
| 2019/0065576 A1* | 2/2019 | Peng | G06F 16/285 |
| 2019/0163818 A1* | 5/2019 | Mittal | G06F 40/30 |
| 2019/0171712 A1* | 6/2019 | Eisenzopf | G06F 40/35 |
| 2019/0171758 A1* | 6/2019 | Pinel | G06N 3/006 |
| 2019/0180639 A1* | 6/2019 | Dechu | G09B 7/00 |
| 2019/0182382 A1* | 6/2019 | Mazza | H04L 51/02 |
| 2019/0212879 A1* | 7/2019 | Anand | G06Q 50/10 |
| 2019/0213284 A1 | 7/2019 | Anand et al. | |
| 2019/0347297 A1* | 11/2019 | Galitsky | G06F 16/9027 |
| 2019/0361977 A1* | 11/2019 | Crudele | G06F 40/211 |
| 2019/0370342 A1 | 12/2019 | Luke et al. | |
| 2020/0242444 A1* | 7/2020 | Zhang | G06F 16/24522 |
| 2021/0097140 A1* | 4/2021 | Chatterjee | G06N 5/022 |
| 2021/0097978 A1* | 4/2021 | Mei | G10L 15/22 |
| 2021/0150152 A1* | 5/2021 | Galitsky | G06F 40/56 |
| 2021/0216714 A1* | 7/2021 | Drzewucki | G06N 7/02 |
| 2022/0027707 A1* | 1/2022 | Wu | G06N 3/045 |
| 2022/0108188 A1* | 4/2022 | Wu | G06N 5/04 |

FOREIGN PATENT DOCUMENTS

| | | | |
|---|---|---|---|
| JP | 2023535913 A | 8/2023 | |
| WO | 2022018676 A1 | 1/2022 | |

OTHER PUBLICATIONS

Bordes et al, "Question answering with subgraph embeddings", 2014, arXiv preprint arXiv:1406.3676. Jun. 14, 2014, pp. 615-620.*

Liu et al, "Approximate subgraph matching-based literature mining for biomedical events and relation", 2013,. PloS one. Apr. 17, 2013;8(4):e60954.*

Xiong et al, "Improving question answering over incomplete kbs with knowledge-aware reader", May 2019, arXiv preprint arXiv: 1905.07098. May 1, 20197, pp. 1-6.*

Hu et al, "Answering natural language questions by subgraph matching over knowledge graphs" IEEE Transactions on Knowledge and Data Engineering. Oct. 26, 2017;30(5):824-37.*

PCT/IB2021-056620, Written Opinion of the International Searching Authority, dated Nov. 1, 2021.

Damljanovic, D., et al., "Natural Language Interfaces to Ontologies: Combining Syntactic Analysis and Ontology-Based Lookup through the User Interaction", Extended Semantic Web Conference, Springer, Berlin, 2010, pp. 106-120.

Blair-Goldensohn, Sasha J., "Long-Answer Question Answering and Rhetorical-Semantic Relations", Thesis, Columbia University, 2007.

Moore, Johanna D., et al., "A Reactive Approach to Explanation", Speech and Natural Language, pp. 1504-1510, 1989.

Carlisle, Scott A., et al., "Explanation Capabilities of Production-Based Consultation Systems", Departments of Computer Science and Clinical Pharmacology, Stanford University, Software Patent Institute, IP.com, IPCOM000150622D, Feb. 28, 1977, 30 pages.

Schlimmer, Jeffrey C., et al., "A Case Study of Incremental Concept Induction", AAAI-86 Proceedings, 1986, pp. 496-501.

Peng, Bin-Bin, et al., "SVM-Based Incremental Active Learning for User Adaptation for Online Graphics Recognition System", Proceedings of the First International Conference on Machine Learning and Cybernetics, Beijing, Nov. 4-5, 2002, pp. 1379-1386.

Riedel, Kurt S., et al., "Orthonormal Representations for Output Systems Pairs", arXiv: 1803.06571v1, Mar. 17, 2018.

Butler, A.C., et al., Explanation Feedback Is Better Than Correct Answer Feedback for Promoting Transfer of Learning, Journal of Educational Psychology, 2013, vol. 105, No. 2, pp. 290-298.

Ferrer-Troyano, Francisco, et al., "Incremental Rule Learning based on Example Nearness from Numerical Data Streams", SAC '05, Proceedings of the 2005 ACM Symposium on Applied Computing, Mar. 2005, pp. 568-572.

Chen, Wenhu, et al., "Variational Knowledge Graph Reasoning", arXiv: 1803.06581v3, Oct. 23, 2018.

Duke University, Marsh Lab, "Understanding learning and memory", accessed on Oct. 31, 2023, 2 pages.

Wikipedia, Machine Learning, accessed on Oct. 31, 2023, 20 pages.

Zendesk, "Zendesk AI already speaks customer service", Artificial Intelligence, accessed on Oct. 31, 2023, 15 pages.

* cited by examiner

| Relation-Knowledge Artifact Map ||
|---|---|
| *Relation, Concept Type* | *Domain Knowledge Component/Artifact* |
| 812 — Relation: equivalent type: verbs, nouns, phrases | Search engine synonyms — 822 |
| 814 — Relation: "in-a" - hypernym | Ontology, search engine extended synonyms — 824 |
| 816 — Relation: cause-effect, or negation | Knowledge graph, search engine extended synonyms — 826 |
| 818 — Relation: symptom-remedy | Knowledge graph — 828 |

NATURAL LANGUAGE ENRICHMENT USING ACTION EXPLANATIONS

BACKGROUND

The present embodiments relate to a virtual dialog system employing an automated virtual dialog agent, such as, for example, a "chatbot," and a related computer program product and computer-implemented method. In certain exemplary embodiments, a knowledge gap between one or more requests and corresponding expected responses is identified and resolved, with the resolution directed at bridging or minimizing the knowledge gap to improve performance of the automated virtual dialog agent.

A chatbot is a computer program that uses artificial intelligence (AI) as a platform to conduct a transaction between an automated virtual dialog agent and, typically, a user such as a consumer. The transaction may involve product sales, customer service, information acquisition, or other types of transactions. Chatbots interact with the user through dialog, often either textual (e.g., online or by text) or auditory (e.g., by telephone). It is known in the art for the chatbot to function as a question-answer component between a user and the AI platform. The quality of the questions and answers are derived from the quality of question understanding, question transformation, and answer resolution. A frequent cause of error, commonly found in a failure to find a corresponding response to a question, is due to a lack of knowledge for an effective transformation of the question into an equivalent knowledge representation that maps to the answer. For example, lack of synonyms or concept relations can limit the ability of the AI platform to determine that the question is equivalent or related to a known question for which an answer is available.

SUMMARY

The embodiments include a system, computer program product, and method for improving performance of a dialog system, and in particular embodiments the improvements are directed to active explanation to dynamically solicit input for relevant knowledge for bridging a knowledge gap.

In one aspect, a system is provided for use with a computer system including a processing unit, e.g. processor, operatively coupled to memory, and an artificial intelligence (AI) platform in communication with the processing unit. The AI platform is configured with tools to direct performance of an operatively coupled dialog system. The tools include a dialog manager, an artificial intelligence (AI) manager, and a director. The dialog manager functions to receive and process natural language (NL) as related to an interaction with an automated virtual dialog agent of the dialog system. The NL includes dialog events in the form of one or more input instances and one or more corresponding output instances or output actions. The AI manager functions to apply the dialog event to a learning program to interpret the one or more requests, identify a knowledge gap, and dynamically bridge the knowledge gap. The director functions to refine the automated virtual dialog agent commensurate with the bridged knowledge gap, with the refinement directed at improving performance of the dialog system.

In another aspect, a computer program product is provided for improving performance of a virtual dialog agent system. The computer program product comprises a computer readable storage medium having program code embodied therewith. The program code is executable by a processor to direct performance of an operatively coupled dialog system. Program code functions to receive and process natural language (NL) as related to an interaction with an automated virtual dialog agent of the dialog system. The NL includes dialog events in the form of one or more input instances and one or more corresponding output instances or output actions. Program code further functions to apply the dialog event to a learning program to interpret the one or more requests, identify a knowledge gap, and dynamically bridge the knowledge gap. Program code is further provided to refine the automated virtual dialog agent commensurate with the bridged knowledge gap, with the refinement directed at improving performance of the dialog system.

In yet another aspect, a computer-implemented method is provided of improving performance of a dialog system. The method comprises: receiving and processing, by a processor of a computing device, natural language (NL) as related to an interaction with an automated virtual dialog agent. The NL includes dialog events in the form of one or more input instances and one or more corresponding output instances or output actions. The dialog event is applied to a learning program to interpret the one or more input instances, identify a knowledge gap, and dynamically bridge the knowledge gap. The automated virtual dialog agent is subject to refinement commensurate with the bridged knowledge gap, with the refinement directed at improving performance of the dialog system.

In a further aspect, a computer system is provided with an artificial intelligence (AI) platform in communication with a processor. The AI platform is configured with tools to direct performance of an operatively coupled dialog system. The tools include a dialog manager, an artificial intelligence (AI) manager, and a director. The dialog manager functions to receive and process natural language (NL) as related to an interaction with an automated virtual dialog agent of the dialog system. The AI manager functions to apply the dialog event to a learning program to interpret one or more input instances, identify a knowledge gap, and dynamically bridge the knowledge gap. The director functions to refine the automated virtual dialog agent commensurate with the bridged knowledge gap, with the refinement directed at improving performance of the dialog system.

These and other features and advantages will become apparent from the following detailed description of the presently exemplary embodiment(s), taken in conjunction with the accompanying drawings.

BRIEF DESCRIPTION OF THE SEVERAL VIEWS OF THE DRAWINGS

The drawings referenced herein form a part of the specification and are incorporated herein by reference. Features shown in the drawings are meant as illustrative of only some embodiments, and not of all embodiments, unless otherwise explicitly indicated.

FIG. 8 depicts a block diagram illustrating an example relation-knowledge artifact-map.

DETAILED DESCRIPTION

Figure 1:
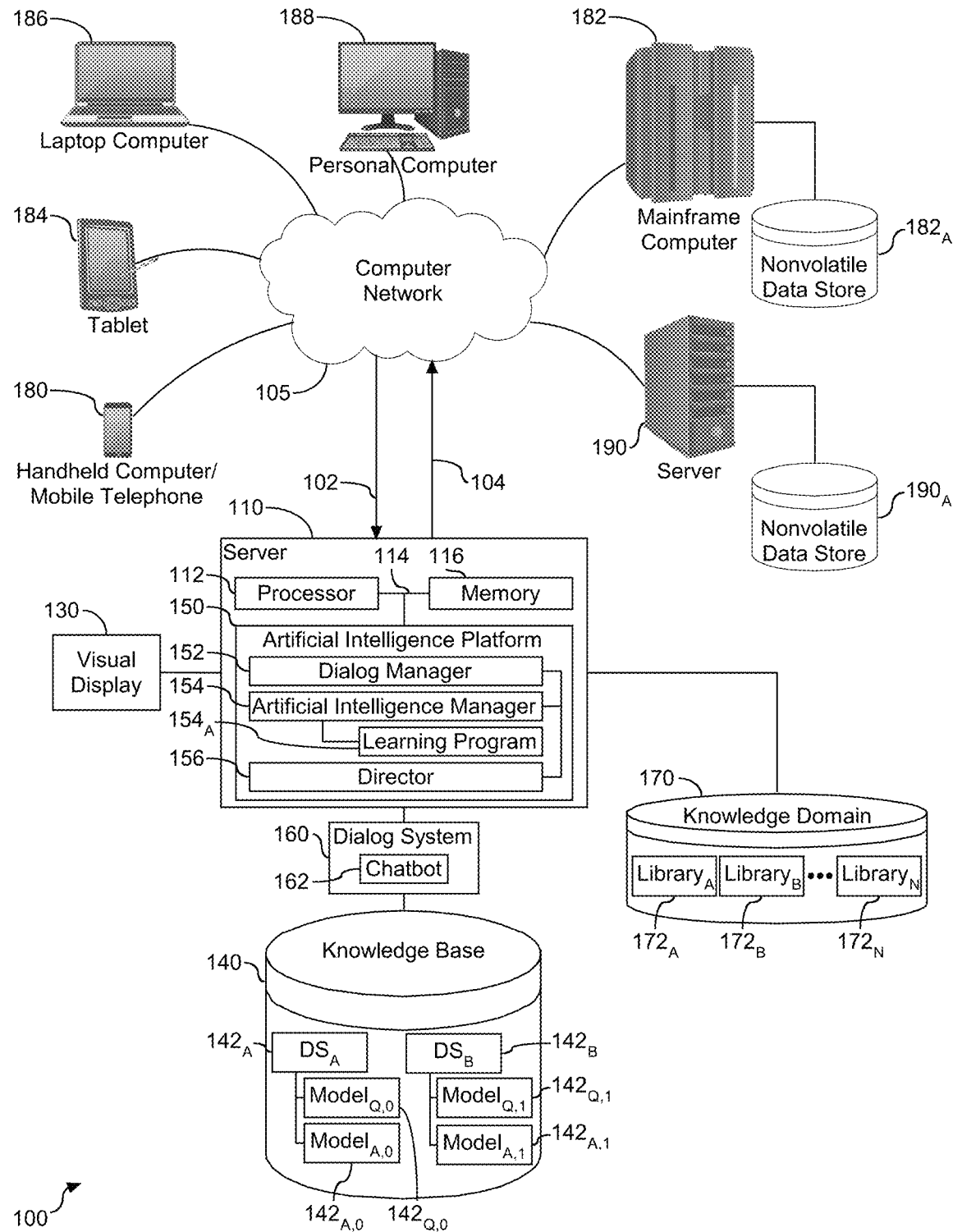
FIG. 1 depicts a system diagram illustrating an artificial intelligence platform computing system in a network environment.

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," "an exemplary embodiment," or "an embodiment" means that a particular feature, structure, or characteristic described in connection with the embodiment is included in at least one embodiment. Thus, appearances of the phrases "a select embodiment," "in one embodiment," "in an exemplary embodiment," or "in an embodiment" in various places throughout this specification are not necessarily referring to the same embodiment. The embodiments described herein may be combined with one another and modified to include features of one another. Furthermore, the described features, structures, or characteristics of the various embodiments may be combined and modified in any suitable manner.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

In the field of artificially intelligent computer systems, natural language systems (such as the IBM Watson® artificially intelligent computer system or and other natural language systems) process natural language based on knowledge acquired by the system. To process natural language, the system may be trained with data derived from a database or corpus of knowledge, but the resulting outcome can be incorrect or inaccurate for a variety of reasons.

Machine learning (ML), which is a subset of Artificial intelligence (AI), utilizes algorithms to learn from data and create foresights based on this data. AI refers to the intelligence when machines, based on information, are able to make decisions, which maximizes the chance of success in a given topic. More specifically, AI is able to learn from a data set to solve problems and provide relevant recommendations. Cognitive computing is a mixture of computer science and cognitive science. Cognitive computing utilizes self-teaching algorithms that use data minimum, visual recognition, and natural language processing to solve problems and optimize human processes.

At the core of AI and associated reasoning lies the concept of similarity. The process of understanding natural language and objects requires reasoning from a relational perspective that can be challenging. Structures, including static structures and dynamic structures, dictate a determined output or action for a given determinate input. More specifically, the determined output or action is based on an express or inherent relationship within the structure. This arrangement may be satisfactory for select circumstances and conditions. However, it is understood that dynamic structures are inherently subject to change, and the output or action may be subject to change accordingly. Existing solutions for efficiently identifying objects and understanding natural language and processing content response to the identification and understanding as well as changes to the structures are extremely difficult at a practical level.

A chatbot is an Artificial Intelligence (AI) program that simulates interactive human conversation by using pre-calculated phrases and auditory or text-based signals. Chatbots are increasingly used in electronic platform for customer service support. In one embodiment, the chatbot may function as an intelligent virtual agent. Each chatbot experience is comprised of a set of communications comprised of user actions and dialog system actions, with the experience having a discriminative behavior pattern. It is understood in the art that chatbot dialogs may be evaluated and subject to diagnosis to ascertain elements of the chatbot that may warrant changes to improve future chatbot experiences. Such evaluations identify patterns of behavior. By studying these patterns, and more specifically by identifying different characteristics of the patterns, the chatbot program may be refined or amended to improve chatbot metrics and future chatbot experiences.

A system, computer program product, and method automatically identify and resolve a knowledge gap. As shown and described herein, the knowledge gap is defined as context representations that are expected to be equivalent but which cannot be derived from one another with sufficient accuracy. The cause for the knowledge gap may stem from different scenarios. For example, domain specific concepts used to describe the request may not be the same as those used to describe the action context or action context may not be complete because a designer missed or omitted specification of elements, e.g. providing details increase solution design labor, or because commonly known or accepted knowledge is assumed.

Two avenues are provided and described in detail below to resolve the identified knowledge gap and provide explanations thereof, including online with an end-user interacting with an artificial intelligence (AI) solution, e.g. chatbot platform, and offline with leveraging a subject matter expert (SME) to review system produced questions and answers. Examples of the provided explanation(s) include, but are not limited to, enforcement of an existing concept relation for a positive response, and qualifying concept relations in context for a negative response. The goal of the explanation is to enrich concept relations presented in the solution. More specifically, domain knowledge is extended to capture concepts and relations, and not limited to questions and answers. An example type of concept relations may be concept relation of equivalence, such as "A" is identified or unconditionally equivalent to "B", e.g. LAN is equivalent to "local area network". If there is any occurrence, A or B can be replaced with the other concept without change of meaning. Another example of a type of concept relations may be concept relations of contextual implication. For example, "A" co-occurs with "B", e.g. Ethernet co-occurs with wire, such that any occurrence of A generates a context of B, or "A" implies "B", e.g. Ethernet implies network and wired network, such that any occurrence of A can be replaced by B and assertions are still true. In an exemplary embodiment and described in detail below, one or more multiple choice questions are generated to elicit possible reasons for similarities or differences.

The chatbot platform functions as an AI interaction interface. As shown and described herein, the chatbot platform is supplemented with leveraging a subject matter expert (SME) to provide ground truth data to bootstrap the system. Ground truth (GT) is a term used in machine learning that refers to information provided by direct observation, e.g. empirical evidence, as opposed to information provided by inference. Attaching one or more taxonomy tags, referred to herein as labels, to GT data provides structure and meaning to the data. Annotated GT, or an annotation, is attached to the document or in one embodiment elements of the document, and indicates the subject matter of elements present within the document. The annotation is created and attached by annotators of different skillsets reviewing documents. Accordingly, domain specific relations are collected from the chatbot platform and the SME.

Referring to FIG. 1, a schematic diagram of an artificial intelligence (AI) platform and corresponding system (100) is depicted. As shown, a server (110) is provided in communication with a plurality of computing devices (180), (182), (184), (186), (188), and (190) across a network connection, e.g. computer network, (105). The server (110) is configured with a processing unit, e.g., a processor, in communication with memory across a bus. The server (110) is shown with an AI platform (150) operatively coupled to a dialog system (160) and a corresponding virtual agent (162), e.g. chatbot, and a knowledge domain (170), e.g. data source. A visual display (130), such as a computer screen or smartphone, is provided for allowing the user to interface with a representation of a virtual agent, e.g. chatbot, (162) on the display (130). While a visual display is illustrated in FIG. 1, it should be understood that the display (130) may be replaced or supplemented by other interface(s), such as an audio interface (e.g., a microphone and speaker), an audio-video interface, etc.

The AI platform (150) is operatively coupled to the network (105) to support interaction with the virtual dialog agent (162) from one or more of the computing devices (180), (182), (184), (186), (188), and (190). More specifically, the computing devices (180), (182), (184), (186), and (188) communicate with each other and with other devices or components via one or more wired and/or wireless data communication links, where each communication link may comprise one or more of wires, routers, switches, transmitters, receivers, or the like. In this networked arrangement, the server (110) and the network connection (105) enable communication detection, recognition, and resolution. Other embodiments of the server (110) may be used with components, systems, sub-systems, and/or devices other than those that are depicted herein.

The AI platform (150) is shown herein operatively coupled to the dialog agent (162), which is configured to receive input (102) from various sources across the network (105). For example, the dialog system (160) may receive input across the network (105) and leverage the data source (170), also referred to herein as the knowledge domain or corpus of information, to create output or response content.

As shown, the data source (170) is configured with a plurality of libraries, shown herein by way of example is library (172$_A$), library$_B$ (172$_B$), . . . , and library$_N$ (172$_N$). Each library is populated with data in the form of feedback data and ground truth data. In an exemplary embodiment, each library may be directed to specific subject matter. For example, in an embodiment, library$_A$ (172$_A$) may be populated with items directed to athletics, library$_B$ (172$_B$) may be populated with items directed finance, etc. Similarly, in an embodiment, the libraries may be populated based on industry. The dialogue system (160) is operatively coupled to the knowledge domain (170) and the corresponding libraries.

The dialogue system (160) is an interactive AI interface to support communication between a virtual agent and a non-virtual agent, such as a user, which can be human or software, and potentially an AI virtual agent. The interactions that transpire generate what are referred to as conversations, with the content of such conversation stored in conversation log files (also referred to as records). Each log file records interactions with the virtual dialog agent (162). According to an exemplary embodiment, each conversation log, e.g., log file, is a recording of questions presented to the dialog system (160) and corresponding answers generated from the dialog system (160). Accordingly, the communication that transpires includes a dialog in an electronic platform between a user and a virtual agent.

The dialog system (160) is operatively coupled to a knowledge base (140) to store the records generated by the dialogs. As shown by way of example, the knowledge base (140) is shown herein with data structures to store representations of the dialog. In this example, there are two data structures, DS$_A$ (142$_A$) and DS$_B$ (142$_B$). The quantity of data structures shown is for illustrative purposes and should not be considered limiting. Each data structure is populated with representations of the requests, e.g. questions, and corresponding generated responses or response actions, e.g. answers. As shown and described in FIGS. 3-8, the questions and corresponding answers of a dialog are represented in models, such as an Abstract Meaning Representation (AMR) tree or a parse tree. In an exemplary embodiment, the dialog question(s) is represented in one model and the dialog answer(s) is represented in another model. By way of example, the first data structure, DS$_A$ (142$_A$), is shown with model$_{Q,0}$ (142$_{Q,0}$) representing the question(s), and model$_{A,0}$ (142$_{A,0}$) representing the corresponding answer(s). Similarly, the second data structure, DS$_B$ (142$_B$), is shown with model$_{Q,1}$ (142$_{Q,1}$) representing the question(s), and model$_{A,1}$ (142$_{A,1}$) representing the corresponding answer(s). The quantity of models shown and described herein is for illustrative purposes and should not be considered limiting. Indeed, it is contemplated that the knowledge base (140) may contain hundreds or thousands of dialogs and corresponding dialog files or dialog data structure, with each dialog data structure having at least one request model and at least one response model.

The various computing devices (180), (182), (184), (186), (188), and (190) in communication with the network (105) may include access points to the dialog system (162). The network (105) may include local network connections and remote connections in various embodiments, such that the AI platform (150) may operate in environments of any size, including local and global, e.g., the Internet. Additionally, the AI platform (150) serves as a back-end system that can make available a variety of knowledge extracted from or represented in documents, network accessible sources and/ or structured data sources. In this manner, some processes populate the AI platform (150), with the AI platform (150) also including input interfaces to receive requests and respond accordingly.

As shown, content may be represented in one or more models operatively coupled to the AI platform (150) via the knowledge base (140). Content users may access the AI platform (150) and the operatively coupled dialog system (160) via a network connection or an Internet connection to the network (105), and may submit natural language input to the dialog system (160) from which the AI platform (150) may effectively determine an output response related to the input by leveraging the operatively coupled data source (170) and the tools that comprise the AI platform (150).

The AI platform (150) is shown herein with several tools to support the dialog system (160) and the corresponding virtual agent (e.g., chatbot) (162), and more specifically, with the tools directed at improving performance of the dialog system (160) and virtual agent (162) experience. The AI platform (150) employs a plurality of tools to interface with and support improving performance of the virtual agent (162). The tools include a dialog manager (152), an artificial intelligence (AI) manager (154), and a director (156).

The dialog manager (152) interfaces with the dialog system (160) via receipt of natural language (NL) related to interaction with the automated virtual dialog agent (162). The received natural language is shown herein populated and stored in the corresponding data structures of the knowledge base (140). Each dialogue event in the knowledge base (140) includes one or more requests and one or more corresponding responses or response actions.

The AI manager (154) is shown herein operatively coupled to the dialog manager (152). The AI manager (154) functions to apply a received or obtained dialog event to a learning program for knowledge gap assessment and remediation. As shown, the learning program ($154_A$) is operatively coupled to the AI manager (154). The learning program ($154_A$) subjects the dialog to an interpretation by producing a response in the form of an explanation of an interpreted request and associated response. In an exemplary embodiment, the explanation is a rule between or bridging two or more concepts. The interpretation enables the learning program ($154_A$) to automatically identify presence of a knowledge gap, if any. More specifically, the learning program ($154_A$) determines whether the input, also referred to herein as an input instance, includes one or more concepts that are not present, e.g. absent from, in the corresponding output instance or output action. Identification of the knowledge gap and instances that require explanation is automated. Examples of scenarios that lead to the knowledge gap identification include, but are not limited to the following: identification of concepts in the question that do not appear as related to the concepts in a corresponding ground truth answer, identification of synonyms in a preferred answer to the terms in question, and identification of terms that describe a differentiating context setting that was not explicitly mentioned in the question yet present in the preferred answer. In an embodiment, the learning program ($154_A$) determines when the input instance and the corresponding output instance or output action(s) are not aligned. In addition to identification of the knowledge gap, the learning program ($154_A$) dynamically solicits pieces of knowledge to extend the explanation of the input instance(s) and map the request(s) to the output instance(s) or output action(s), thereby effectively bridging the identified knowledge gap. In an exemplary embodiment, the AI manager (154) receives ground truth data to bootstrap the data source (170). Similarly, in an embodiment, the AI manager (154) enriches the data source (170) with the explanation and the solicited pieces of knowledge. In an exemplary embodiment, the learning program ($154_A$) analyzes multiple pairs of input instance(s) and output instance(s) or action(s), e.g. input and output, of the dialog system. This extends the functionality of the learning program ($154_A$) to identify one or more features common among two or more pairs of requests and responses, which may then be leveraged to solicit pieces of knowledge to reduce or eliminate the knowledge gap.

The AI manager (154) represents the interpretation of the dialog in the form of a model, such as but not limited to, $model_{Q,0}$ ($142_{Q,0}$) representing the question(s) and $model_{A,0}$ ($142_{A,0}$) representing the corresponding answer(s). The model representation enables the AI manager (154) to leverage the structure and functionality of the corresponding models to compare content there, e.g. text of the question answer pair, and to determine any similarities or differences corresponding to concept relations. In an exemplary embodiment, the model is a representation of the dialog events in a subtree format. The AI manager (154) quantifies the knowledge gap with a measurement of a distance between subgraphs with a common node label. In an exemplary embodiment, the measured distance corresponds to or is an indicator of complexity of the identified knowledge gap. In addition to the comparison, the AI manager (154) may generate one or more questions for the dialogue manager (152) to communicate through the dialog system (160) and corresponding virtual agent (162). In an exemplary embodiment, the dialog manager (152) receives one or more answers to the generated questions. The received answer functions as an indicator of the identified knowledge gap and is communicated to the AI manager for knowledge gap assessment and remediation.

The director (156) is shown herein operatively coupled to the dialog manager (152), the AI manager (154) and the dialog system (160). The director (156) is configured to refine the virtual agent (162) in relation to the corresponding dialog event. The refinement is in the form of leveraging the chatbot platform to facilitate and enable system interaction to collect domain specific relations from correct responses, such as ground truth, or positive feedback. Details of the refinement are shown and described in FIG. 3. The refinement bridges or mitigates the knowledge gap to thereby improve performance of the dialog system (160) by enhancing accuracy of the response as related to the request.

The dialog events that are created or enabled by the dialog system (160) may be processed by the IBM Watson® server (110), and the corresponding artificial intelligence platform (150). The dialog manager (152) performs an analysis of received natural language using a variety of reasoning algorithms. There may be hundreds or even thousands of reasoning algorithms applied, each of which performs different analysis, e.g., comparisons. For example, some reasoning algorithms may look at matching of terms and synonyms within the language of the received dialog and the corresponding responses or response action. In one embodiment, the dialog manager (154) may process the electronic communication to identify and extract features within the communication. Whether through use of extracted features and feature representations, or an alternative platform for processing electronic records, the dialog manager (152) processes the dialog events in an effort to identify and parse events and a behavioral characteristic of the dialog events. In an exemplary embodiment, behavioral characteristics include, but are not limited to, language and knowledge. In one embodiment, the platform identifies grammatical components, such as nouns, verbs, adjectives, punctuation, punctuation marks, etc. in the requests and corresponding responses or response actions. Similarly, in one embodiment, one or more reasoning algorithms may look at temporal or spatial features in language of the electronic records.

In some illustrative embodiments, server (110) may be the IBM Watson® system available from International Business Machines Corporation of Armonk, New York, augmented with the mechanisms of the illustrative embodiments described hereafter.

The dialog manager (152), the AI manager (154), and the director (156) hereinafter referred to collectively as AI tools, are shown as being embodied in or integrated within the artificial intelligence platform (150) of the server (110). The AI tools may be implemented in a separate computing system (e.g., 190) that is connected across network (105) to the server (110). Wherever embodied, the AI tools function to evaluate dialog events, extract behavior characteristics from the requests and responses, selectively identify a knowledge gap, and through active explanation dynamically solicit input for knowledge that is relevant to bridge the knowledge gap and improve question transformation and knowledge representation.

In selected example embodiments, the dialog manager (152) may be configured to apply NL processing to identify the behavior characteristics of the dialog events. For example, the NL manager (152) may perform a sentence structure analysis, with the analysis entailing a parse of the subject sentence(s) and the parse to denote grammatical terms and parts of speech. In one embodiment, the NL manager (152) may use a Slot Grammar Logic (SGL) parser to perform the parsing. The NL manager (152) may also be configured to apply one or more learning methods to match detected content to known content to decide and assign a value to the behavior characteristic.

Types of information handling systems that can utilize the artificial intelligence platform (150) range from small handheld devices, such as handheld computer/mobile telephone (180) to large mainframe systems, such as mainframe computer (182). Examples of handheld computers (180) include personal digital assistants (PDAs), personal entertainment devices, such as MP4 players, portable televisions, and compact disc players. Other examples of information handling systems include a pen or tablet computer (184), a laptop or notebook computer (186), a personal computer system (188), and a server (190). As shown, the various information handling systems can be networked together using computer network (105). Types of computer network (105) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server (190) utilizes nonvolatile data store ($190_A$), and mainframe computer (182) utilizes nonvolatile data store ($182_A$)). The nonvolatile data store ($182_A$) can be a component that is external to the various information handling systems or can be internal to one of the information handling systems.

The information handling system employed to support the artificial intelligence platform (150) may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 2:
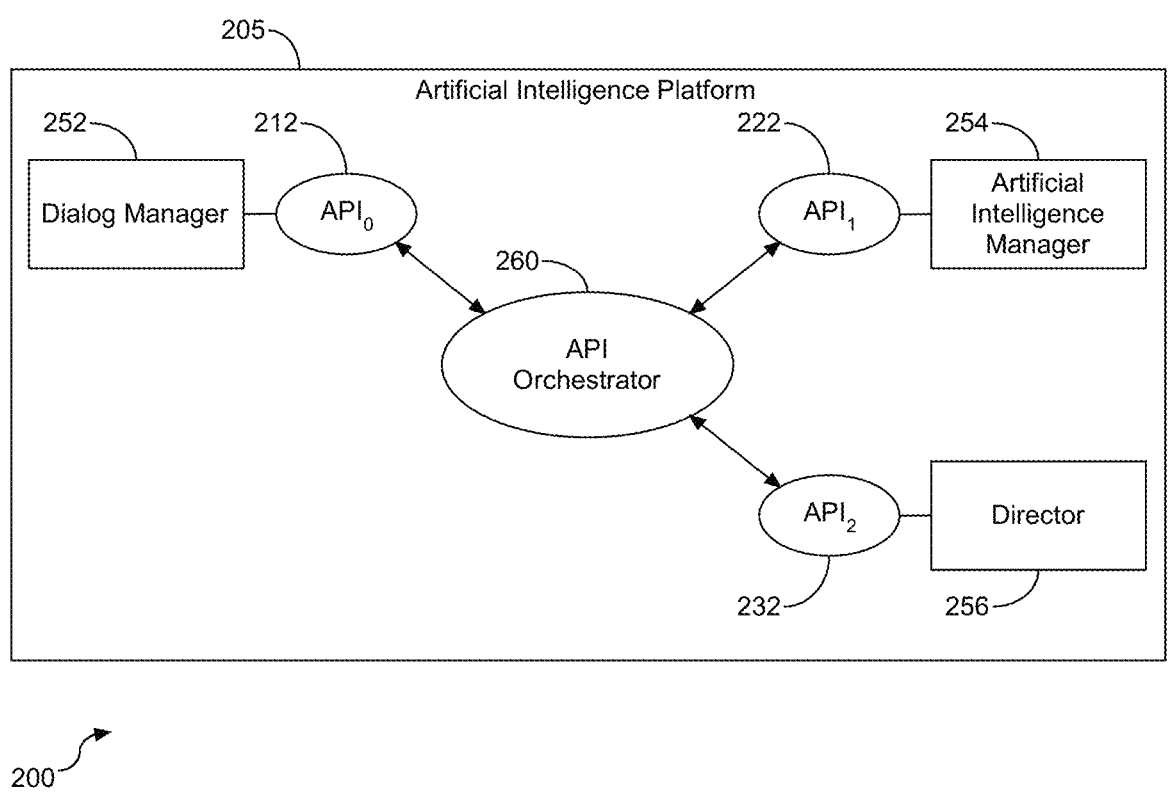
FIG. 2 depicts a block diagram illustrating the artificial intelligence platform tools, as shown and described in FIG. 1, and their associated application program interfaces.

An Application Program Interface (API) is understood in the art as a software intermediary between two or more applications. With respect to the artificial intelligence platform (150) shown and described in FIG. 1, one or more APIs may be utilized to support one or more of the tools (152), (154), and (156) and their associated functionality. Referring to FIG. 2, a block diagram (200) is provided illustrating the tools (152), (154), and (156), and their associated APIs. As shown, a plurality of tools are embedded within the AI platform (205), with the tools including the dialog manager (252) associated with $API_0$ (212), the AI manager (254) associated with $API_1$ (222), the director (256) associated with $API_2$ (232). Each of the APIs may be implemented in one or more languages and interface specifications. $API_0$ (212) provides functional support to receive and evaluate dialog events and determine behavioral characteristics; $API_1$ (222) provides functional support to apply the received dialog event to a learning program to identify and resolve a knowledge gap; and $API_2$ (232) provides functional support to refine the virtual dialog again with resolution of the knowledge gap. As shown, each of the APIs (212), (222), and (232) are operatively coupled to an API orchestrator (260), otherwise known as an orchestration layer, which is understood in the art to function as an abstraction layer to transparently thread together the separate APIs. In an embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 3:
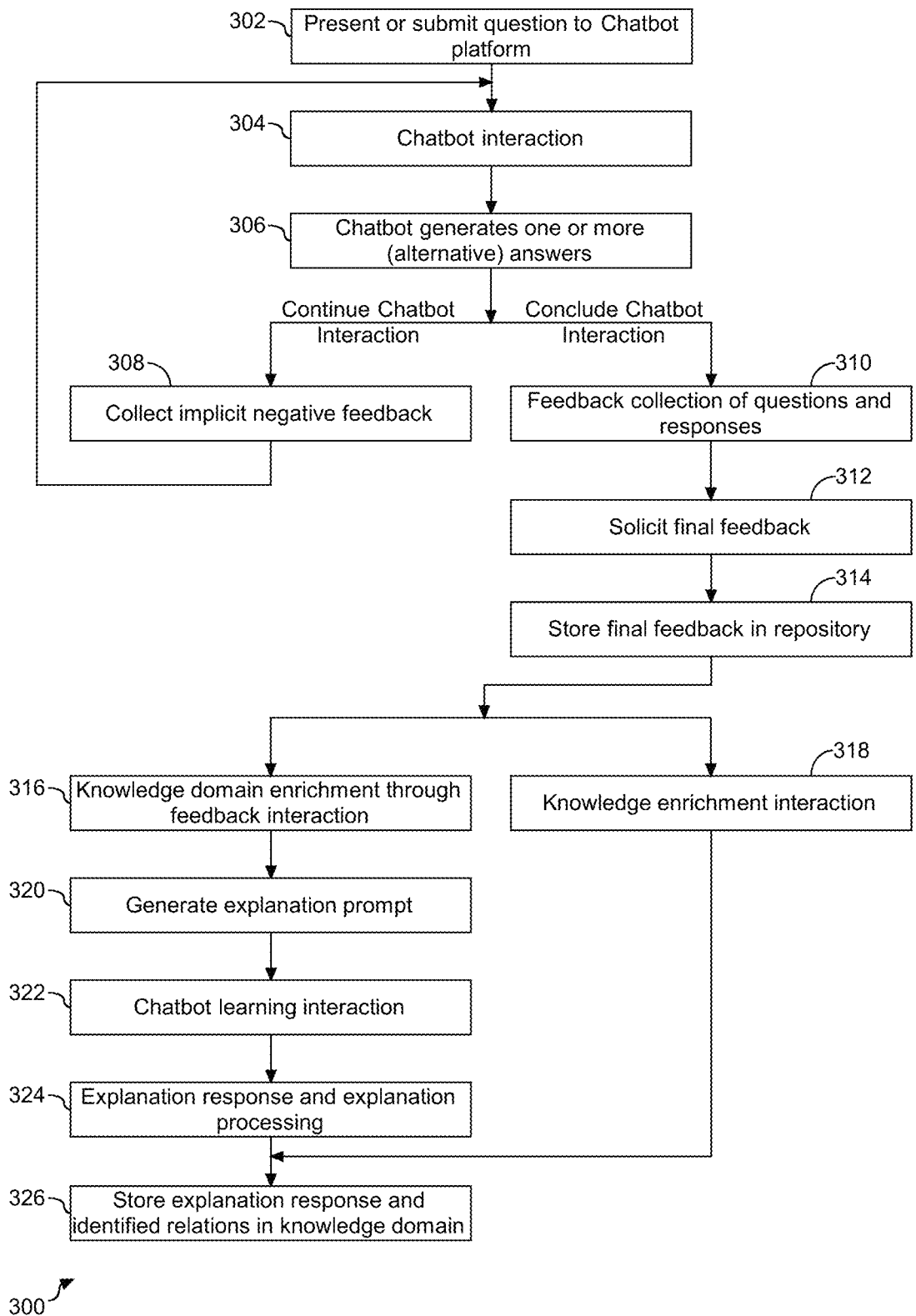
FIG. 3 depicts a flowchart illustrating an embodiment of a method of enriching a corpus of trusted domain-specific semantic relations.

Referring to FIG. 3, a flow chart (300) illustrating a process for enriching a corpus of trusted domain-specific semantic relations is provided. As shown and described, a virtual communication platform referred to herein as a chatbot, functions as the basis or platform for the corpus enrichment. A question is presented or submitted in the chatbot platform (302), to solicit or initiate a chatbot interaction and response data (304). The chatbot employs natural language processing (NLP) together with a corpus of knowledge to generate one or more answers to the submitted question (306). In an embodiment with multiple answer generation, the generated answers are referred to as alternative answers. It is understood in the art that the generated response may not provide an accurate or intended answer. If the user is not satisfied with the answer and wants to continue the interaction, the system may collect implicit negative feedback (308), followed by a return to step (304) for continued chatbot interaction. In an embodiment, the continued interaction provides implicit negative feedback. If the user wants to terminate the interaction, the process continues with collection of feedback (310), which in an embodiment includes a collection of questions and corresponding responses (310) for which final feedback is solicited from the user (312). The final feedback may be in positive or negative feedback, and corresponds to the final answer provided by the chatbot platform. Examples of feedback include 'the answer is good' or 'the answer is helpful' as forms of positive feedback, and 'the answer is bad' or 'the answer is not helpful' are examples of negative feedback. In an exemplary embodiment, in the case of negative feedback, multi-choice questions may be utilized to qualify the scope of error, such as 'content is incorrect' or 'content not found'.

The feedback, e.g. final feedback, is stored in a repository at (314), and leveraged by system starting at step (316) to enrich the domain knowledge. The enrichment may be responsive to positive feedback or negative feedback. Similarly, the enrichment may be through the chatbot platform or through ground truth provided by a subject matter expert (SME). Similarly, the enrichment may assess presence of a knowledge gap, if any, and resolve such gaps through the domain knowledge enrichment in the form of feedback interaction via the chatbot (162). It is understood in the art that various methods may have been utilized to generate responses to the chatbot, and as such, some matches between a question, e.g. input, and a corresponding generated answer may be partial, e.g. partially good or partially bad. Although they may be considered overall as a good answer, there may be knowledge gaps present that could benefit from additional information. Similarly, the system may consider an answer to be good, when the feedback is negative, and as such requires or could benefit from identification information or knowledge to clarify the discrepancy.

Learning, also referred to herein as learning interactions, is shown herein bifurcated into feedback interaction (316) and knowledge enrichment interaction (318). Feedback interaction leverages the chatbot platform to facilitate and enable system interaction to collect domain specific relations from correct responses, such as ground truth, or positive feedback. These relations are used to augment the domain knowledge. Feedback interaction (316) is followed by generation of an explanation prompt (320), details which include a knowledge gap assessment, as shown and described in FIG. 5. An explanation request is generated and presented to the chatbot platform for learning interaction (322). Feedback is generated through the chatbot platform in the form of an explanation response, and is subject to explanation processing (324). Details of the explanation processing are shown and described in detail in FIG. 6. Knowledge enrichment is conducted asynchronously and is solicited from a subject matter expert (SME), as shown at step (318). Details of the knowledge enrichment are shown and described in FIG. 4. The knowledge enrichment at step (318) leverages an interaction channel with one or more SMEs that the system uses to fetch or otherwise obtain questions and corresponding answers and solicit an explanation request in the form of ground truth. In an exemplary embodiment, the ground truth is used to augment the domain knowledge to enhance accuracy of data communication through the chatbot platform. Ground truth can be positive, e.g. correct answer, or negative, e.g. invalid answer. In an embodiment, the ground truth is collected in a dedicated question-answer data structure from which items are extracted and used to generate requests for explanations from one or more SMEs. Accordingly, active explanation channels are leveraged for augmentation of the domain knowledge, also referred to herein as corpus enrichment, to enhance and extend the capture of concepts and relationships for future interactions.

Figure 4:
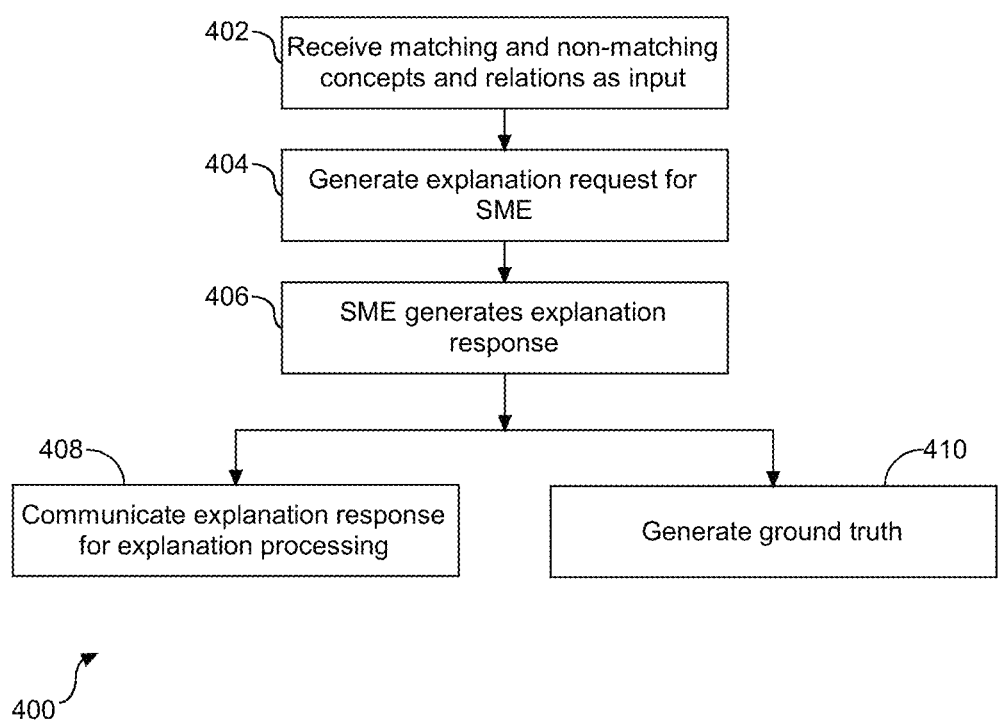
FIG. 4 depicts a flowchart illustrating an embodiment of a method of knowledge enrichment interaction.

Referring to FIG. 4, a flow chart (400) is provided to illustrate a process directed at knowledge enrichment interaction. As shown and described, an explanation request is generated in which a corresponding schema of knowledge is leveraged to develop questions to enrich domain knowledge with one or more relations. Generation of the explanation options start from the results of the knowledge gap assessment. As shown and described in FIG. 5, first and second data structures are populated with matching and non-matching concepts and relations, respectively, which are used herein as input (402). The scope of the knowledge enrichment is learning based on explicit feedback, which may be positive or negative feedback, and possibly combined with implicit feedback, either positive or negative. During chatbot platform training, one or more subject matter experts (SMEs) generate or produce ground truth in the form of sets of questions and corresponding answers from which the chatbot platform learns how to answer presented questions and answers, e.g. chatbot training. Ground truth can be positive, e.g. good answer to a presented question, or negative, e.g., invalid answer to a presented question. In an exemplary embodiment, ground truth is collected in a corresponding data structure. As shown, items are fetched from corresponding question and answers, whether matching or non-matching, and an explanation request targeted to an SME is generated (404). Requests for explanation can be on an individual basis or in one or more bundles in which questions and corresponding answers are grouped together, e.g. csv files. The SME generates an explanation response (406) which is communicated across a communication channel for explanation processing for analysis and collection of new semantic relations (408), as shown and described in FIG. 7. In addition, the SME generates ground truth (410) which is populated in a corresponding data structure.

Figure 5:
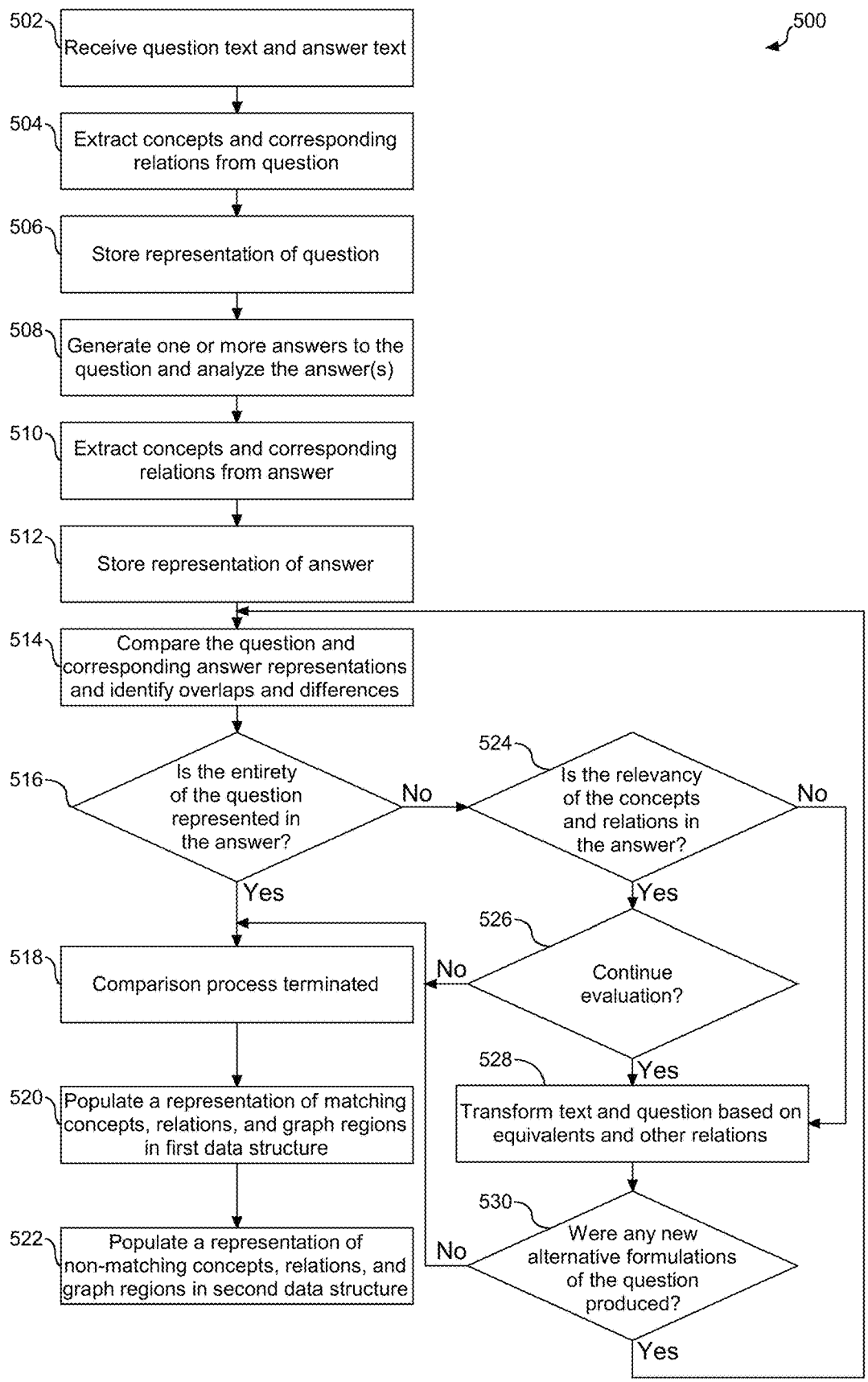
FIG. 5 depicts a flowchart illustrating an embodiment of a method of generating an explanation.

Referring to FIG. 5, a flow chart (500) illustrating a process for generation of an explanation is provided. As shown and described, the initial aspect of the explanation generation process is directed at a knowledge gap assessment to process natural language terms from the questions and answers obtained from the chatbot environment where these terms are represented in a model for understanding and consumption by a machine. The process starts with input in the form of question text and corresponding answer text (502), which in an embodiment is obtained from the chatbot platform. With respect to the question, concepts within the question and corresponding relations are extracted through use of a natural language tool (504). In an exemplary embodiment, the tool analyzes the question to identify components therein, such as an object, verb-object relations, or noun-object relations, etc. Information in a corresponding knowledge domain is used to identify and extract concepts, e.g. failure actions, attributes, product management actions, product names, product components, etc. Similarly, in an embodiment, a classifier based on a neural language model or sequence model may be employed to label which terms are relevant to the corresponding knowledge domain.

A representation of components of the question as identified at step (504), also referred to herein as a request, are stored in a corresponding data structure (506). For example, in an embodiment, the identified question components are represented as an Abstract Meaning Representation (AMR) tree or a parse tree. AMR is a semantic representation that expresses the logical meaning of sentences with rooted, directed, acyclic graphs. AMR associates semantic concepts with nodes on a graph, while relations are label edges between concept nodes. In an exemplary embodiment, AMR expresses the semantic representation of the sentences in a hierarchy, which is an organization technique in which items are layered or grouped to reduce complexity.

Following the extraction and representation at steps (504) and (506), respectively, the answer to the question is analyzed (508) similar to the question analysis. More specifically, one or more answers to the question are generated and subject to analysis at step (508). In an exemplary embodiment, the answers are obtained from a corresponding knowledge base or knowledge domain. The analysis subjects the answer(s) to similar NL processing as the question, wherein one or more components in the question, e.g. subject or object, and corresponding characteristics, etc. are identified. The analysis identifies relevance of the extract concepts and relations instances, and in an embodiment, subjects the concepts and relations instances to a ranking, and represents or characterizes the relevance in the data structure representing the question. In an exemplary embodiment, information in the knowledge domain is used for the analysis and identification. The information includes, but is not limited to, concepts or relations of a specific type, such as failure actions and attributes, product management actions, e.g. restart, delete, and configure, product names, and product components. Similarly, in an embodiment, a classifier based on a neural language model or sequence model is utilized to label which terms are relevant for the domain. In an exemplary embodiment, the extracted concepts and relations may be arranged in a hierarchy based on the ranking. Similar to the question processing, the concepts within the answer text and relations from the question for the answer are extracted and a representation of components of the answer as identified at step (510), also referred to herein as a response, are stored in a corresponding data structure (512). Similar to the question processing, in an embodiment the identified answer components are represented as an Abstract Meaning Representation (AMR) tree or a parse tree. In an exemplary embodiment, representations of the question and answer can comprise multiple data structures representing multiple cognitive features. Accordingly, both the question and corresponding answer text are subject to concept and relations extraction.

The list of elements of the question(s) and answer(s) populated in the corresponding data structures or models at steps (506) and (512) correspond to specific selection criterion, e.g. matching or different. The lists may be generated by applying comparison methods specific for each type of feature representation. For example, the two data structures may be received as input with output from the comparison method generating a list of elements that exist in both data structure, a list of elements that exist in only the first data structure, and a list of elements that only exist in the second data structure. For a relation graph, differences in semantic or syntactic relation graph subtrees are identified to determine subtrees that are identical or within a distance threshold. For example, a distance may be measured between subgraphs with common node labels, such as the quantity of relations that originate or conclude in a common node.

Following step (512), the representations of the question and corresponding answer are subject to comparison to extract overlaps and differences (514). The comparison determines differences in semantic or syntactic relation graph subtrees to determine those subtrees that are identical or within a distance threshold. Distance may be measured between subgraphs with common node labels, such as the number of relations that originate or end in the common node, that are different, i.e. have different node in a triplet (common-node, common-relation, node), or are missing, i.e. common-node, relation-in-only one of the compared trees. For example, in an exemplary embodiment, the question in the scenario is "product batt must be replaced" and is shown with the following AMR representation:

```
(o / obligate-01
    :ARG2 (r / replace-01
        :ARG1 (e / product
            :ARG1-of (e2 / batt) ) ) )
``` and the answer text 'How to replace battery on product' is shown with the following AMR representation:

```
(a / amr-unknown
    :ranner (r / replace-01
        :ARG1 (b / battery)
        :ARG2 (e / product)
```

Based upon this example, the subtree representations have a common node "replace-01" and the related subtrees are at a distance of 1 because the relations <replace, 'action', battery> and <batt, action, unknown are different. The analysis determines that 'battery' is a concept of type 'component' and 'batt' is unknown. Accordingly, the comparison leverages the data structures created at steps (506) and (512) for the comparison.

It is then determined if the entirety of the extracted question concepts and relations is represented in the extracted answer concepts and relations (516). A positive response to the determination is an indication that the question and answer match, e.g. align, and there is no knowledge gap present and the comparison process terminates (518). In an exemplary embodiment, the assessment at step (516) is directed at a concept represented in a tier of the hierarchy. A negative response to the determination at step (516) is followed by a subsequent determination to assess the concepts and relations with respect to relevancy as identified within the question at step (506) and their representation in the answer (524). In an exemplary embodiment, the assessment at step (524) is directed at a different tier in the hierarchy, e.g. a concept different from the assessment at step (516). A positive response to the assessment at step (524) is an indication of the assessed question or aspect of the question determined to be present within the corresponding answer, or in an embodiment, within an assessed or identified concept of the corresponding answer. Accordingly, as shown herein, an overlap of the answer and question may be directed to an assessment of one or more concepts identified therein.

As shown and described, the assessment at step (524) is directed to a concept identified or represented within the question, and may not pertain to the question in its entirety. Following a positive response to the assessment at step (524), it is determined if the assessment between the question and answer should continue by evaluating additional concepts represented within the hierarchy of the question (526). In an exemplary embodiment, a user may refer to one element of a concept represented in a hierarchy, but the relevant content is about a related concept in a different tier in the hierarchy. Continued assessment corresponding to a positive response to step (526) will require additional time, and in an embodiment, may be a distraction from the chatbot experience. A negative response to the determination at step (526) terminates the assessment process as shown herein by a jump to the determination sequence starting at step (518). However, a positive response to the determination at step (526) or a negative response to the determination at step (524) is followed by transforming the text of the question based on equivalents, such as is-a, symptom-action, and other relations available in the domain knowledge (528). The transformation at step (528) is directing at identifying differences between the question and the corresponding answer. In an exemplary embodiment, one or more language models are used to determine equivalent sentences to the question that match with terms found in any previous matches corresponding to the question. It is then determined if there any new alternative formulations of the question were produced (530). A positive response at step (530) is followed by a return to step (514), and a negative response is followed by a jump to the termination sequence starting at step (518).

At such time as the evaluation concludes, shown herein as a negative response to the determination at steps (526) and (530), and following step (518), corresponding first and second data structures are populated. More specifically, a representation of matching concepts, relations, and graph regions is populated in a first corresponding data structure (520). Similarly, a representation of non-matching concepts, relations, and graph regions are populated in a second corresponding data structure (522). Although shown sequentially, in an exemplary embodiment, the population of the first and data structures at steps (520) and (522) may take place in parallel or in an alternative order. The first data structure is populated with elements of the question and elements of the answer that correspond to specific selection criterion, e.g. matching in both representations, and the second data structure is populated with elements of the question and elements of the answer that corresponding to specific selection criterion that are different, e.g. present in only one of the representations. Lists are generated by applying comparison methods specific to each type of feature representation. For example, in a list of concepts, the procedure receives as input two lists and traverses and compares the items in the lists and outputs a list of elements that exist in both, e.g. matching concepts, and a list of elements that exist in only the first input and a list of elements that exist in only the second input, e.g. non-matching concepts. In an embodiment that utilizes AMR, the procedure may output the pairs of subgraphs that have the same root node labels, and the edges in the graphs that have the same label and same adjacent node labels, e.g. matching concepts.

As shown and described, an assessment is conducted to determine or identify the presence of a knowledge gap, which is akin to ascertaining that there is not a match between the question(s) and the answer(s). In an exemplary embodiment, the use of the term match is directed at an exact match as well as a match of synonymous terms. The use of the term 'match' is based on a comparison of the words expressed in the question and the presence of those words in the answer. The knowledge gap might in the form of missing connections, such as missing synonyms or a missing inference of a relationship. Although the user of the system provides feedback in the form of final feedback, the system analyzes the questions and corresponding answers stored in the repository. In an exemplary embodiment, an engagement policy directed at the user with respect to knowledge gap assessment is provided to address users of different skills and different patience levels, and as such the engagement policy selectively directs learning interaction of the knowledge gap. Partial match may be satisfactory or good responses, the system can learn what made the match good and learn additional relations that brought confidence of the answer. Accordingly, the engagement policy may learn from both positive and negative feedback collected.

Output from the knowledge gap assessment shown in FIG. 5 generates one or more explanation options for relations between the question(s) and answer(s). As shown in FIGS. 4 and 5, the initial aspect is directed as an automatic assessment of the knowledge gap, wherein the knowledge gap or absence of the knowledge gap is identified. Once the knowledge gap is determined or identified, the process proceeds to options of how to fill the knowledge gap. Artifacts of an explanation management system provided for several types of knowledge, shown herein as rule of mismatch to explanatory mapping artifact, presentation templates to generate output for the user provided explanations, and management policy to be applied when more than one explanation type is a match. The following table, Table 1, is an example of artifacts of an explanation management system provided for several types of knowledge:

TABLE 1

| Pattern on mismatch/match | Type of Feedback | Explanation Type |
|---|---|---|
| Action to component: Distance 1 on subgraph with root node on action verb and linked to a domain component in one subgraph | Q/A-Positive | Component Explanation Targets: entities linked to the common action verb. Explanation relations: Equivalence, same-in-this-context-only higher-level concept, lower level concept |
| Component to action: distance 1 on two subgraphs that have different actions related to the same component, when no other alternative (action, component) relations exists | Q/A-Positive | Action Explanation Targets: actions related to common component Explanation relations: Equivalence, higher-level concept, lower level concept |
| Symptom to solution: distance >1, Q about trouble, with main action-phrase in A related to component in Q, or to one related to it in domain ontology | Q/A-Positive | Solution Explanation: Targets: trouble Q and main action phrase in A Explanation relation: is-solution |
| Context missing in question: Full match of Q graph into A graph; There are action/component descriptors not matching in Q and not in Domain Knowledge | Q/A-Negative | Context Explanation: Targets: component/action describing features. Explanation relation: relevance |
| Context missing in match: Same or better match of Q graph into A-negative than in A-positive. There are action/component descriptors in A-positive and not in A-negative | Q/A-Positive | Context Explanation: Targets: component/action describing features. Explanation relation: relevance |

TABLE 1-continued

| Pattern on mismatch/match | Type of Feedback | Explanation Type |
| --- | --- | --- |
| Action-component relation in Q and A and not in Domain Knowledge | Q/A-Positive | Context Explanation: Targets: component/action describing features. Explanation relation: relevance |

The following table, Table 2, is an example of presentation templates to generate output for the user provided explanations:

TABLE 2

| Explanation Type | Part of Message | Target | Pattern |
| --- | --- | --- | --- |
| Any | Opening | Online | Please answer this question |
| Component Explanation/Action Explanation | Focus | Online | {selection-1} is for {selection-2} . . . |
| Solution Explanation | Focus | Online | {selection-2} is action for state {selection-1} |
| Any | Relation | Online | Unrelated-relation |
| Any | Relation | Any | Unknown-relation |
| Any | Closing | Online | Thank you |
| Any | Batch-Opening | Batch | In answering the following questions please consider the following definitions of relations: Equivalents: "kbd is equivalent to keyboard" . . . |
| Any | Opening | Batch | " . . . " |
| Unknown Correspondent | Opening | Batch | Please collect the terms or phrases related to the text in column "Term to Explain" |

The following table, Table 3, is an example of management policy to be applied when more than one explanation type is a match:

TABLE 3

| Relation Type | Target | Pattern |
| --- | --- | --- |
| Equivalence | Online | Equivalent, such as "kbd vs keyboard" |
| Higher-level | Online | Hyponym, such as "computer vs. laptop" |
| Solution Explanation | Online | {selection-2} is action for state {selection-1} |
| Unrelated relation | Any | "Unrelated concept" |
| Unknown relation | Any | "I do not know" |
| Equivalence | Batch | Equivalent |

Figure 6:
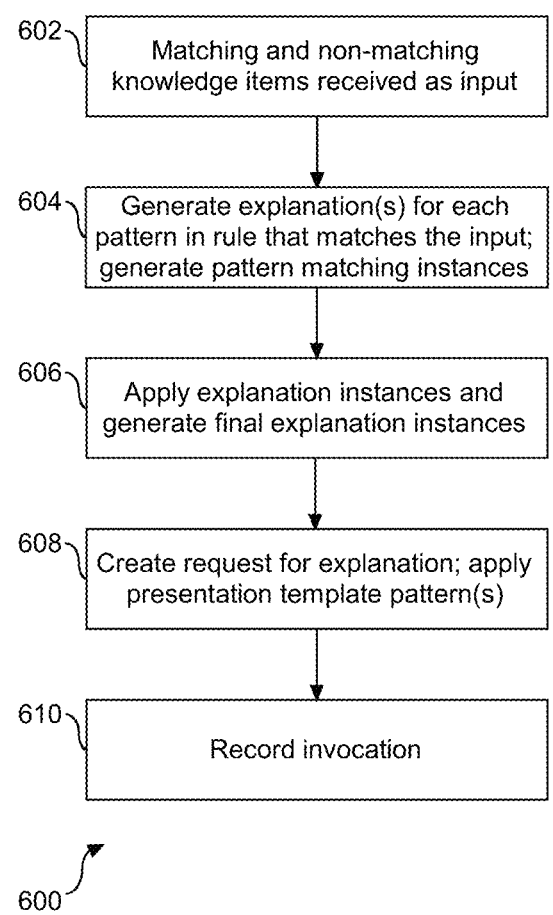
FIG. 6 depicts a flowchart illustrating an embodiment of a method of generating explanation options as semantic relations between question and answer phrases to enrich the domain knowledge.

Referring to FIG. 6, a flow chart (600) is provided to illustrate a process for generating explanation options as semantic relations between question and answer phrases to enrich the domain knowledge. It is understood that some aspects of semantic relationships between questions and answers may have been previously ascertained and represented or stored in the domain knowledge. For example, such prior semantic relationships may have been used to identify matches between questions and answers in FIG. 5. In an exemplary embodiment, both differences and similarities between questions and answers are subject to analysis, with the similarity analysis to enrich the domain knowledge. The process of generating explanation options uses a schema of the corresponding domain knowledge to develop questions to enrich the domain with relations. The domain knowledge provides information on what is already known in terms of equivalent and relations.

As shown, input is provided in the form of the data structures generated in FIG. 5 that contain the matching and non-matching knowledge items (602). It is understood that the knowledge items from the input may contain positive feedback or negative feedback. For positive feedback, if multiple differences exist, they are ranked by complexity, such as distance of neighboring graphs, and in an embodiment starts with smaller distances. The differences are filtered by skill of the user expected to respond to explanations. For example, a user with a lower skill will not be asked to explain differences represented with a larger distance between graphs or subgraphs with common node labels. The choices for explanation depend on the type of relations captured in the knowledge domain. For negative feedback, selection may take plan on different criteria. Artifacts of an explanation management system provide for the following types of knowledge: rules to associate sets of patterns into types of explanation, presentation templates to generate output for the user providing explanation, and system or management policy to be applied when more than one explanation types matches an input. For each pattern in the rule that matches the input, explanation instance(s) are generated as output (604). The output from step (604) is a list of pattern matching instances. In an exemplary embodiment, one pattern can apply to additional graph regions. Following step (604), the system or management policy is applied to a list of explanation instances to generate output in the form of final explanation instances to be presented to the user (606). In an exemplary embodiment, at step (606) set of explanation types are selected for presentation. A request for explanation is created by applying one or more presentation template patterns to create output to be sent to the chatbot platform (608). Details of the invocation are recorded (610), wherein patterns are matched within the explanation management system for processing. The presentation templates are organized based on interaction, explanation type, explained relation, or output sections, e.g. opening statement and closing statement.

The following is an example of a structured question for a user for online interaction:
  Please answer this question:
  "batt" is for "battery"
  1) Equivalent
  2) Higher-level concept (hyponym)
  3) Lower-level concept (hypernym)
  4) Unrelated concept The following is an example annotation question for batch interaction:
  Please collect the terms or phrases related to the text in column "Term to Explain" in columns:
  1) Equivalent
  2) Higher-level concept (hyponym)
  3) Lower-level concept (hypernym)
  4) Other relation or Other text Accordingly, as shown herein a set of presentation templates in the form of questions and multiple choice answers are used to generate the output for the user providing explanation. Questions qualify how you would represent relationships in a corresponding knowledge graph.

As shown and described herein, a policy corresponds to phrasing one or more questions, e.g. prompts, to generate synchronous responses that will explain the semantic relationship, or lack thereof, between the question and the answer. Similarly, in an embodiment, asynchronous response may be obtained via use of the SME requesting an explanation of an answer, or a batch of answers. Accordingly, the explanation may be obtained via a synchronous channel through use of the chatbot platform or an asynchronous channel through the SME.

Figure 7:
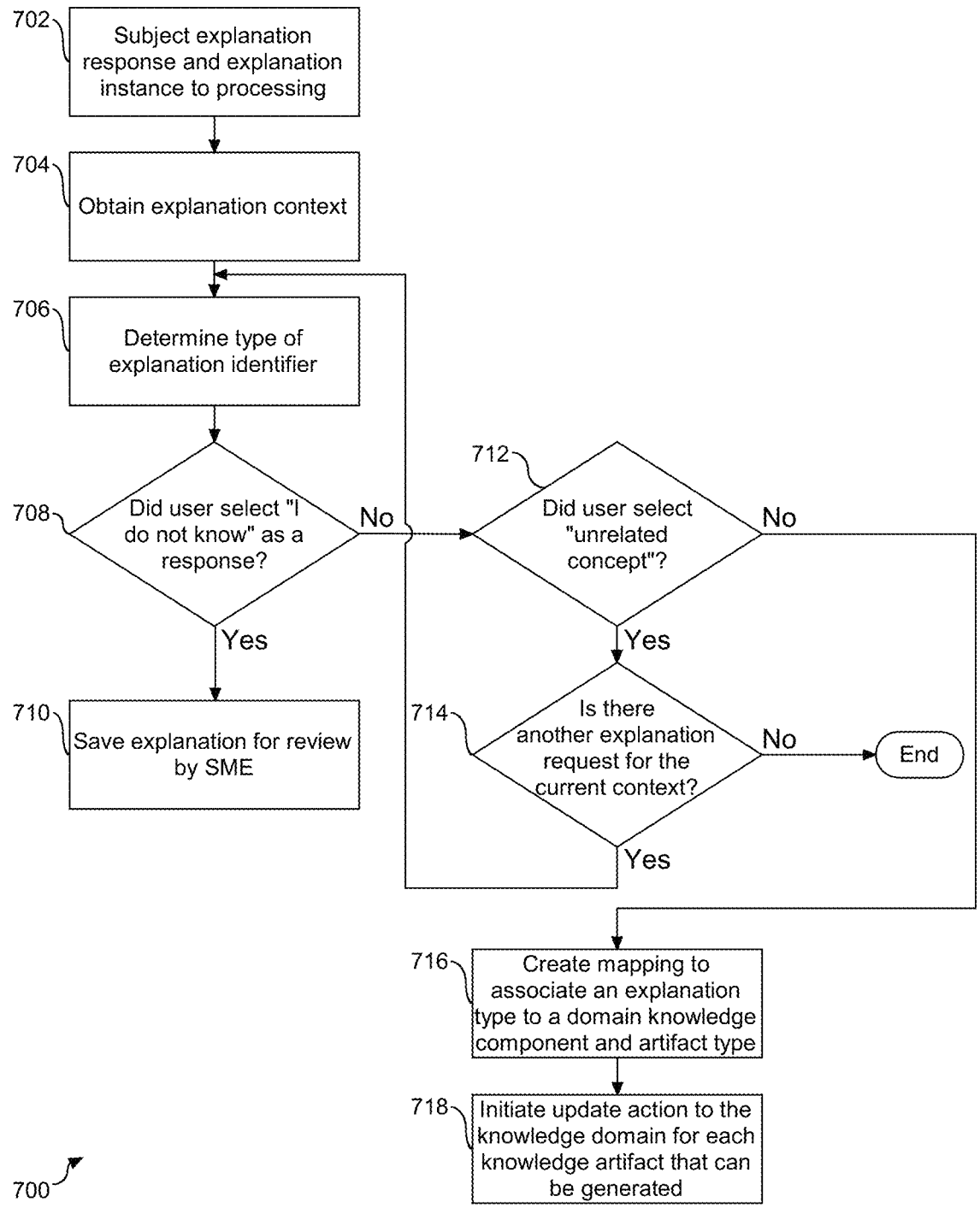
FIG. 7 depicts a flow chart illustrating processing and recording explanations of relationships between the questions and answers.

Referring to FIG. 7, a flow chart (700) is provided to illustrate processing and recording explanations of relationships between the questions and answers. The explanation processing and recording leverages the explanation context ascertained in FIG. 6. An explanation response for one explanation instance is subject to processing (702). In an exemplary embodiment, each explanation instance has a corresponding explanation identifier. Each explanation identifier is a reference to metadata stored in an explanation management system that collects all the details about the explanation instance. The collected details include one or more of the following: the question, answer, concepts, and relation similarities and differences, as well as explanation goals and parameters. Using the explanation identifier or other details in the explanation response, the explanation context, including details about the explanation goals and parameters, is obtained (704). Thereafter, using the selected explanation choice in the explanation response and explanation metadata, the type of relation identified by the user is determined (706). It is then determined if the user selected "I do not know" as a response (708). A positive response at step (708) is followed by saving the explanation for review by an SME (710), and a negative response at step (708) is followed by determining if the user selected "unrelated concept" as a response (712). A positive response to the determination at step (712) is followed by determining if there is another explanation request for the current context (714). A positive response to the determination at step (714) is followed by a return to step (706), and a negative response concludes the explanation assessment.

A negative response to the determination at step (712) is an indication that knowledge artifacts can be created from the user indicated relation. A mapping is created to associate an explanation type, e.g. type of relation and type of concepts, to one or more domain knowledge components and artifact type(s) (714), followed by an update action to the knowledge domain for each knowledge artifact that can be generated from the user indicated relation (716).

Referring to FIG. 8, a block diagram (800) is provided to illustrate an example relation-knowledge artifact-map. As shown there are two columns in the map, including a relation-concept type column (810) and a domain knowledge component-artifact column (820). In this example, an equivalent relation for verbs, nouns, and phrases (812), such as equivalent meanings expressed in verb, noun, or phrase formats is integrated in the search engine as synonyms (822). Similarly, an "is-a" or hypernym relation (814) is integrated in search engine extended synonyms (824), a cause-effect or negation relation (816) is integrated as knowledge graph or search engine extended synonyms (826), and a relation synonym-remedy (818) is a knowledge graph artifact (828). For each knowledge artifact that can be generated, an update action to the domain knowledge is initiated (718). The update action(s) at step (718) can be applied immediately or collected and applied in a batch at a predefined system maintenance window. Accordingly, as shown herein the knowledge gap is subject to analysis to process an explanation thereof.

Returning to FIG. 3 and as shown and described, active learning is implemented from an explanation of semantic relations. As shown, an explanation request (318) is bifurcated into the chatbot platform for learning interaction (322) and solicitation of ground truth via one or more SMEs (318). In an exemplary embodiment, when the correspondence between questions and answers are weak, e.g. not strong, the system generates one or more candidate explanatory relations that could enforce the correspondence, e.g. as shown and described in FIG. 5, and utilizes an interface, e.g. chatbot, to qualify the relevance. The learning interaction enables or supports online evaluation of the explanation. In an exemplary embodiment, feedback on the quality of the answers can be used to trigger learning from explanation, e.g. implicit or explicit feedback, positive or negative feedback, etc. Similarly, in an embodiment, policy may be used to determine when to trigger interaction for an explanation request at step (318) in order to control impact on user satisfaction. An example policy may be in the form of only implement on negative feedback, or another example policy may be on the skill level of the user, e.g. novice. As shown, the learning interaction (320) generates an explanation response (322), which is subject to processing and recording explanations of relationships between the questions and answers (324), as shown and described in FIG. 7. Following steps (324) and (318), the processing of the explanation response and identified relations are stored in the domain knowledge (326). Accordingly, the relationship and corresponding artifacts between a target phrase and any missing information is identified and stored in the knowledge base.

As shown and described in FIGS. 1-8, a computer system, program product, and method are provided to compare question and answer pairs, and specifically the text thereof, and determine similarities and differences in terms of concept relations with respect to how an answer relates or refers to an expected relation as derived from the question. The similarities and differences are leveraged to generate specific multiple choice questions about possible reasons for the difference(s). The questions are presented in an AI interactive platform, e.g. chatbot platform, to extract relations from correct responses, such as ground truth or positive feedback. The extracted relations, and in an embodiment new relations, e.g. explanatory information, are identified and employed to augment the domain knowledge, thereby extending the domain knowledge with captured concepts and relations.

Figure 9:
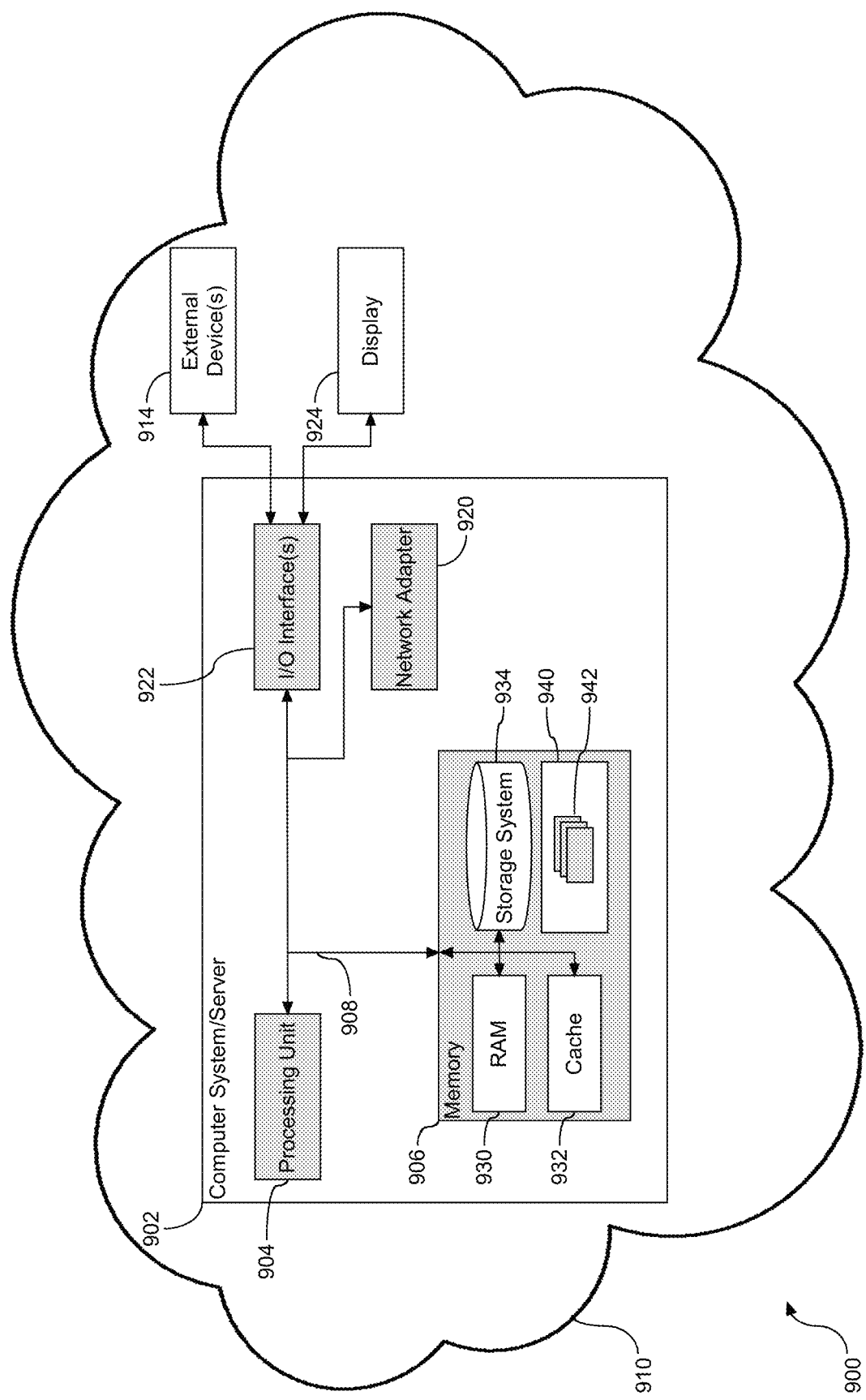
FIG. 9 depicts a block diagram illustrating an example of a computer system/server of a cloud based support system, to implement the system and processes described above with respect to FIGS. 1-8.

Embodiments shown and described herein may be in the form of a computer system for use with an intelligent computer platform for enriching domain knowledge. Aspects of the tools (152), (154), and (156)) and their associated functionality may be embodied in a computer system/server in a single location, or in an embodiment, may be configured in a cloud based system sharing computing resources. With reference to FIG. 9, a block diagram (900) is provided illustrating an example of a computer system/server (902), hereinafter referred to as a host (902) in communication with a cloud based support system (910), to implement the system, tools, and processes described above in FIGS. 1-8. In an embodiment, host (902) is a node of a cloud computing environment. The host (902) is operational with numerous other general purpose or special purpose computing system environments or configurations. Examples of well-known computing systems, environments, and/or configurations that may be suitable for use with host (902) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

The host (902) may be described in the general context of computer system-executable instructions, such as program modules, being executed by a computer system. Generally, program modules may include routines, programs, objects, components, logic, data structures, and so on that perform particular tasks or implement particular abstract data types. The host (902) may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, the host (902) is shown in the form of a general-purpose computing device. The components of host (902) may include, but are not limited to, one or more processors or processing units (904), e.g. hardware processors, a system memory (906), and a bus (908) that couples various system components including system memory (906) to processor (904). The bus (908) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. The host (902) typically includes a variety of computer system readable media. Such media may be any available media that is accessible by the host (902) and it includes both volatile and non-volatile media, removable and non-removable media.

The system memory (906) can include computer system readable media in the form of volatile memory, such as random access memory (RAM) (930) and/or cache memory (932). By way of example only, storage system (934) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus (908) by one or more data media interfaces.

Program/utility (940), having a set (at least one) of program modules (942), may be stored in the system memory (906) by way of example, and not limitation, as well as an operating system, one or more application programs, other program modules, and program data. Each of the operating systems, one or more application programs, other program modules, and program data or some combination thereof, may include an implementation of a networking environment. Program modules (942) generally carry out the functions and/or methodologies of embodiments to dynamically interpret and understanding request and action descriptions, and effectively augment corresponding domain knowledge. For example, the set of program modules (942) may include the tools (152), (154), and (156) as shown in FIG. 1.

The host (902) may also communicate with one or more external devices (914), such as a keyboard, a pointing device, etc.; a display (924); one or more devices that enable a user to interact with the host (902); and/or any devices (e.g., network card, modem, etc.) that enable the host (902) to communicate with one or more other computing devices. Such communication can occur via Input/Output (I/O) interface(s) (922). Still yet, the host (902) can communicate with one or more networks such as a local area network (LAN), a general wide area network (WAN), and/or a public network (e.g., the Internet) via network adapter (920). As depicted, the network adapter (920) communicates with the other components of the host (902) via the bus (908). In an embodiment, a plurality of nodes of a distributed file system (not shown) is in communication with the host (902) via the I/O interface (922) or via the network adapter (920). It should be understood that although not shown, other hardware and/or software components could be used in conjunction with the host (902). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (906), including RAM (930), cache (932), and storage system (934), such as a removable storage drive and a hard disk installed in a hard disk drive.

Computer programs (also called computer control logic) are stored in memory (906). Computer programs may also be received via a communication interface, such as network adapter (920). Such computer programs, when run, enable the computer system to perform the features of the present embodiments as discussed herein. In particular, the computer programs, when run, enable the processing unit (904) to perform the features of the computer system. Accordingly, such computer programs represent controllers of the computer system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

The functional tools described in this specification have been labeled as managers. A manager may be implemented in programmable hardware devices such as field programmable gate arrays, programmable array logic, programmable logic devices, or the like. The managers may also be implemented in software for processing by various types of processors. An identified manager of executable code may, for instance, comprise one or more physical or logical blocks of computer instructions which may, for instance, be organized as an object, procedure, function, or other construct. Nevertheless, the executables of an identified manager need not be physically located together, but may comprise disparate instructions stored in different locations which, when joined logically together, comprise the managers and achieve the stated purpose of the managers.

Indeed, a manager of executable code could be a single instruction, or many instructions, and may even be distributed over several different code segments, among different applications, and across several memory devices. Similarly, operational data may be identified and illustrated herein within the manager, and may be embodied in any suitable form and organized within any suitable type of data structure. The operational data may be collected as a single data set, or may be distributed over different locations including over different storage devices, and may exist, at least partially, as electronic signals on a system or network.

Figure 10:
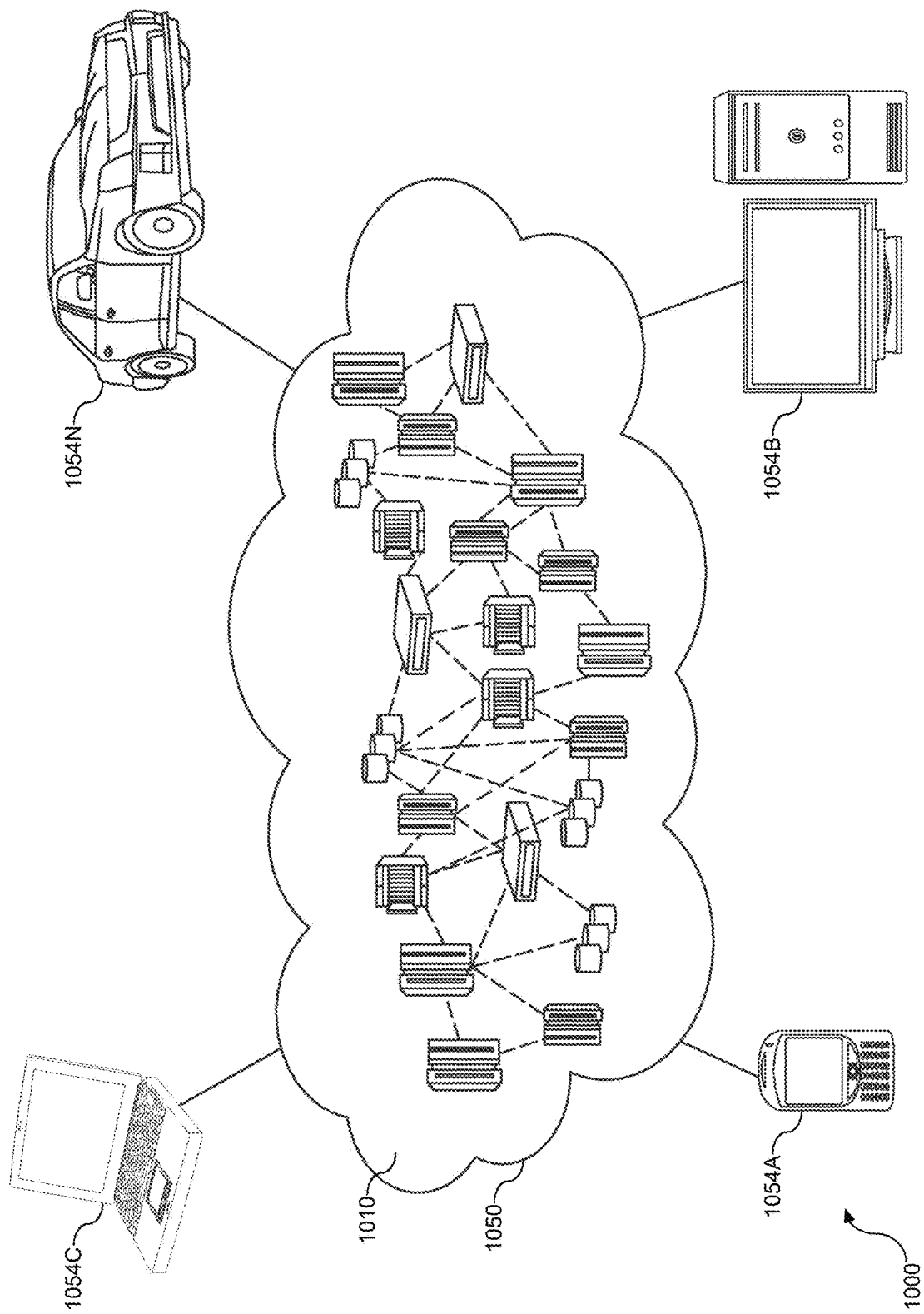
FIG. 10 depicts a block diagram illustrating a cloud computer environment.

Referring now to FIG. 10, an illustrative cloud computing network (1000). As shown, cloud computing network (1000) includes a cloud computing environment (1050) having one or more cloud computing nodes (1010) with which local computing devices used by cloud consumers may communicate. Examples of these local computing devices include, but are not limited to, personal digital assistant (PDA) or cellular telephone (1054A), desktop computer (1054B), laptop computer (1054C), and/or automobile computer system (1054N). Individual nodes within nodes (1010) may further communicate with one another. They may be grouped (not shown) physically or virtually, in one or more networks, such as Private, Community, Public, or Hybrid clouds as described hereinabove, or a combination thereof. This allows cloud computing environment (1000) to offer infrastructure, platforms and/or software as services for which a cloud consumer does not need to maintain resources on a local computing device. It is understood that the types of computing devices (1054A-N) shown in FIG. 10 are intended to be illustrative only and that the cloud computing environment (1050) can communicate with any type of computerized device over any type of network and/or network addressable connection (e.g., using a web browser).

Figure 11:
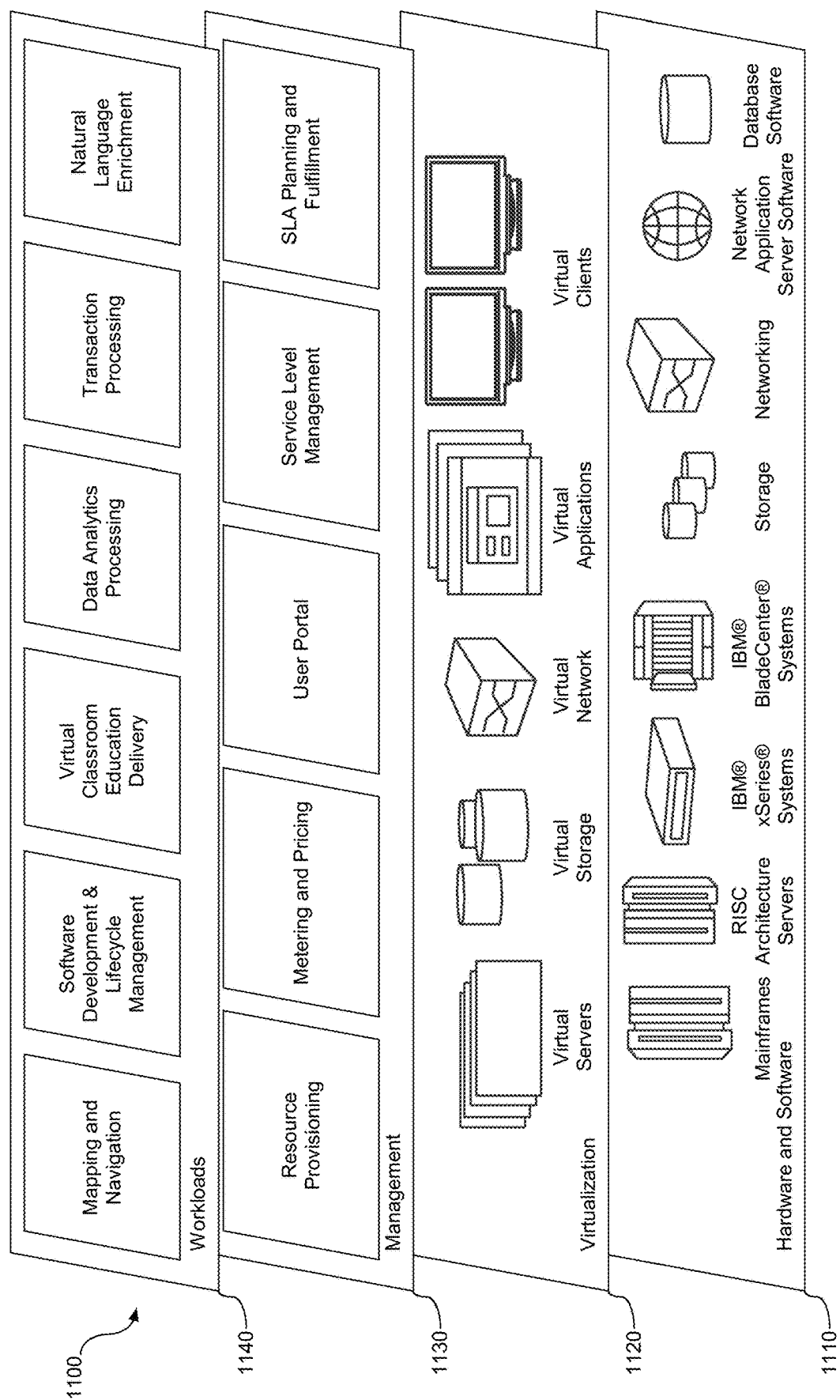
FIG. 11 depicts a block diagram illustrating a set of functional abstraction model layers provided by the cloud computing environment.

Referring now to FIG. 11, a set of functional abstraction layers (1100) provided by the cloud computing network of FIG. 10 is shown. It should be understood in advance that the components, layers, and functions shown in FIG. 11 are intended to be illustrative only, and the embodiments are not limited thereto. As depicted, the following layers and corresponding functions are provided: hardware and software layer (1110), virtualization layer (1120), management layer (1130), and workload layer (1140).

The hardware and software layer (1110) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (1120) provides an abstraction layer from which the following examples of virtual entities may be provided: virtual servers; virtual storage; virtual networks, including virtual private networks; virtual applications and operating systems; and virtual clients.

In an example, management layer (1130) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (1140) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and natural language enrichment.

While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles. As used herein, the term "and/or" means either or both (or one or any combination or all of the terms or expressed referred to).

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product is operative to support natural language enrichment.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. Accordingly, the scope of protection of the embodiments is limited only by the following claims and their equivalents.

What is claimed is:

1. A computer system comprising: a processor operatively coupled to a memory; and
an artificial intelligence (AI) platform in communication with the processor, the AI platform having tools to direct performance of a dialog system, the tools comprising:
a dialog manager configured to receive natural language (NL) related to interaction with an automated virtual dialog agent, the NL comprising one or more dialog events, each of the dialog events including input and output, the input comprising one or more input instances and the output comprising one or more corresponding output instances or actions;
an AI manager, operatively coupled to the dialog manager, configured to apply the received one or more dialog events to a learning program, the application including the learning program configured to:
interpret the one or more input instances and the one or more corresponding output instances or actions, including represent the one or more dialog events in a model;
identify a knowledge gap associated with one or more of the interpreted instances or actions;

measure distance between subgraphs of the model with a common node label;

leverage structure and functionality of one or more corresponding models to compare content and to determine any similarities or differences corresponding to concept relations;

provide an ontology representation of any similarities or differences corresponding to concept relations; and dynamically generate one or more alternative knowledge items to bridge the identified knowledge gap; and a director configured to refine the automated virtual dialog agent in relation to the one or more dialog events, the refinement corresponding to the bridged knowledge gap to improve performance of the dialog system.

2. The computer system of claim 1, wherein the learning program is configured to analyze multiple pairs of input and output of the dialogue system, identify one or more features common among the multiple pairs, and leverage the identified one or more common features to solicit pieces of knowledge.

3. The computer system of claim 2, wherein the AI manager is configured to update a corresponding domain knowledge with an explanation and the solicited pieces of knowledge.

4. The computer system of claim 3, wherein the AI manager is configured to receive ground truth data to bootstrap the domain knowledge.

5. The computer system of claim 1, wherein the interpretation of the one or more input instances further comprises the AI manager to leverage the model to compare text of question answer pairs and determine any similarities and differences in terms of concept relations.

6. The computer system of claim 2, wherein the solicitation of pieces of knowledge further comprises the AI manager configured to generate one or more questions from the determined similarities and differences, present the generated one or more questions through the dialog system, and receive at least one answer to the generated one or more questions, the at least one answer functioning as an indicator to the identified knowledge gap.

7. The computer system of claim 5, wherein the measured distance corresponds to complexity of the identified knowledge gap.

8. The computer system of claim 1, wherein the identification of the knowledge gap includes the AI manager configured to determine when the one or more input instances comprises one or more concepts absent from the one or more corresponding output instances or actions.

9. The computer system of claim 1, wherein the AI manager is further configured to solicit selection of at least one of the one or more generated alternative knowledge items, the selection to bridge the identified knowledge gap.

10. The computer system of claim 1, wherein the refinement corresponding to the bridged knowledge gap to improve performance of the dialog system is conducted online with an end-user interacting with an AI solution.

11. The computer system of claim 1, wherein the model is an abstract meaning representation (AMR) tree or a parse tree.

12. A computer program product to support active learning, the computer program product comprising:

a computer readable storage medium having a program code embodied therewith, the program code executable by a processor to:

receive natural language (NL) relating to interaction with an automated virtual dialog agent of a dialog system, the NL comprising one or more dialog events, each of the one or more dialog events including input and output, the input comprising one more input instances and the output comprising one or more corresponding output instances or output actions;

apply the received dialogue events to an artificial intelligence (AI) learning program to:

interpret the one or more input instances and the one or more corresponding output instances or output actions, including represent the one or more dialog events in a model identify a knowledge gap associated with one or more of the interpreted instances or actions;

measure distance between subgraphs of the model with a common node label;

leverage structure and functionality of one or more corresponding models to compare content and to determine any similarities or differences corresponding to concept relations;

provide an ontology representation of any similarities or differences corresponding to concept relations; and dynamically generate one or more alternative knowledge items to bridge the knowledge gap; and refine the automated virtual dialog agent in relation to the dialog event corresponding to the bridged knowledge gap to improve performance of the dialog system.

13. The computer program product of claim 12, further comprising program code executable by the processor to analyze multiple pairs of input and output of the dialogue system, identify one or more features common among the multiple pairs, and leverage the identified one or more common features to solicit pieces of knowledge.

14. The computer program product of claim 13, further comprising program code executable by the processor to update a corresponding domain knowledge with an explanation and the solicited pieces of knowledge, and enrich a corresponding domain knowledge with the explanation and the solicited pieces of knowledge.

15. The computer program product of claim 12, wherein the program code to interpret the one or more input instances further comprises program code executable by the processor to leverage the model to compare text of question answer pairs and determine any similarities and differences in terms of concept relations.

16. The computer program product of claim 13, wherein the program code executable by the processor to solicit pieces of knowledge further comprises program code executable by the processor to generate one or more questions from the determined similarities and differences, present the generated one or more questions through the dialog system, and receive at least one answer to the generated one or more questions, the at least one answer functioning as an indicator to the identified knowledge gap.

17. The computer program product of claim 15, wherein the measured distance corresponds to complexity of the identified knowledge gap.

18. A computer-implemented method directed at performance of a dialog system, the method comprising:

receiving, by a processor of a computing device, natural language (NL) relating to interaction with an automated virtual dialog agent of a dialog system, the NL comprising one or more dialog events, each of the one or more dialog events including input and output, the input comprising one more input instances and the output comprising one or more corresponding output instances or output actions;

applying, by the processor, the received one or more dialog events to an artificial intelligence (AI) platform comprising a learning program, the applying comprising:

interpreting the one or more input instances and the one or more corresponding output instances or output actions, including representing the one or more dialog events in a model;

identifying a knowledge gap associated with the interpreted one or more input instances and the one or more corresponding output instances or output actions;

measuring distance between subgraphs of the model with a common node label;

leveraging structure and functionality of one or more corresponding models to compare content and to determine any similarities or differences corresponding to concept relations;

providing an ontology representation of any similarities or differences corresponding to concept relations; and dynamically generating one or more alternative knowledge items to bridge the knowledge gap; and refining the automated virtual dialog agent in relation to the one or more dialog events corresponding to the bridged knowledge gap to improve performance of the dialog system.

19. The computer-implemented method of claim 18, further comprising the learning program analyzing multiple pairs of input and output of the dialog system, identifying one or more features common among the multiple pairs, and leveraging the identified one or more common features to solicit pieces of knowledge.

20. The computer-implemented method of claim 19, further comprising updating a corresponding domain knowledge with an explanation and the solicited pieces of knowledge, and enriching a corresponding domain knowledge with the explanation and the solicited pieces of knowledge.

21. The computer-implemented method of claim 19, further comprising receiving ground truth data to bootstrap the domain knowledge.

22. The computer-implemented method of claim 18, wherein interpreting the one or more input instances further comprises leveraging the model to compare text of question answer pairs and determine any similarities and differences in terms of concept relations.

23. The computer-implemented method of claim 19, wherein soliciting pieces of knowledge further comprises generating one or more questions from the determined similarities and differences, presenting the generated one or more questions through the dialog system, and receiving at least one answer to the generated one or more questions, the at least one answer functioning as an indicator to the identified knowledge gap.

24. The computer-implemented method of claim 22, wherein the measured distance corresponds to complexity of the identified knowledge gap.

25. A computer system comprising:

an artificial intelligence (AI) platform in communication with a processor, the AI platform having tools to direct performance of a dialog system, the tools comprising:

a dialog manager configured to receive natural language (NL) related to interaction with an automated virtual dialog agent of the dialog system, the NL comprising one or more dialog events, each of the dialog events including input and output, the input comprising one or more input instances and the output comprising one or more corresponding output instances;

an AI manager, operatively coupled to the dialog manager, configured to apply the received one or more dialog events to a learning program, the learning program configured to:

represent the one or more dialog events in a model, leverage the model to compare text of question answer pairs, and determine one or more similarities and differences in terms of concept relations, wherein the model represents the one or more dialog events;

identify a knowledge gap between the one or more input instances and the one or more corresponding output instances;

measure distance between one or more subgraphs of the model with a common node label, wherein the measured distance corresponds to complexity of the identified knowledge gap;

leverage structure and functionality of one or more corresponding models to compare content and to determine any similarities or differences corresponding to concept relations;

provide an ontology representation of any similarities or differences corresponding to concept relations; and dynamically generate one or more alternative knowledge items to bridge the knowledge gap; and a director configured to refine the automated virtual dialog agent, the refinement corresponding to the bridged knowledge gap.

* * * * *